US011130881B2

(12) United States Patent
Evans et al.

(10) Patent No.: US 11,130,881 B2
(45) Date of Patent: Sep. 28, 2021

(54) COATING COMPOSITIONS FOR PACKAGING ARTICLES AND METHODS OF COATING

(71) Applicant: SWIMC LLC, Cleveland, OH (US)

(72) Inventors: Richard H. Evans, Wexford, PA (US); Jeffrey Niederst, Leechburg, PA (US); Robert M. O'Brien, Monongahela, PA (US); Benoit Prouvost, L'Abergement de Cuisery (FR); Kevin Romagnoli, Pittsburgh, PA (US); Grant Schutte, Pittsburgh, PA (US); Paul Stenson, Avon, CT (US); Tom Van Kuren, Mars, PA (US)

(73) Assignee: SWIMC LLC, Cleveland, OH (US)

( * ) Notice: Subject to any disclaimer, the term of this patent is extended or adjusted under 35 U.S.C. 154(b) by 189 days.

(21) Appl. No.: 13/651,796

(22) Filed: Oct. 15, 2012

(65) Prior Publication Data
US 2013/0280455 A1 Oct. 24, 2013

Related U.S. Application Data

(63) Continuation of application No. PCT/US2011/032738, filed on Apr. 15, 2011.

(60) Provisional application No. 61/333,133, filed on May 10, 2010, provisional application No. 61/324,997, filed on Apr. 16, 2010.

(51) Int. Cl.
B32B 1/02 (2006.01)
C09D 171/08 (2006.01)
C08G 59/06 (2006.01)
C08G 59/24 (2006.01)
C09D 5/08 (2006.01)
B21D 31/00 (2006.01)
B65D 25/00 (2006.01)
B32B 1/08 (2006.01)

(52) U.S. Cl.
CPC ........... C09D 171/08 (2013.01); B21D 31/00 (2013.01); B65D 25/00 (2013.01); C08G 59/066 (2013.01); C08G 59/24 (2013.01); C09D 5/08 (2013.01); Y10T 428/1355 (2015.01)

(58) Field of Classification Search
CPC ....... B32B 1/02; B32B 1/08; Y10T 428/1352; Y10T 428/13
USPC ................................. 428/35.7, 36.9
See application file for complete search history.

(56) References Cited

U.S. PATENT DOCUMENTS 2,500,449 A 3/1950 Bradley
2,528,933 A 11/1950 Wiles
2,633,458 A 3/1953 Shokal
2,681,901 A 6/1954 Wiles et al.
2,694,694 A 11/1954 Owen et al.
2,767,157 A 10/1956 Masters
2,824,855 A 2/1958 Freeman et al.
2,951,778 A 9/1960 Haberlin
3,006,891 A 10/1961 Leroy et al.
3,041,300 A 6/1962 Morrison
3,085,992 A 4/1963 Lee et al.
3,102,043 A 8/1963 Winthrop et al.
3,121,727 A 2/1964 Baliker, Jr. et al.
3,153,008 A 10/1964 Fox
3,220,974 A 11/1965 Fox
3,275,601 A 9/1966 Schnell et al.
3,288,884 A 11/1966 Sonnabend et al.
3,297,724 A 1/1967 McConnell et al.
3,313,775 A 4/1967 Frankel et al.
3,321,424 A 5/1967 Imes et al.
3,366,600 A 1/1968 Haberlin et al.
3,379,684 A 4/1968 Wiesner et al.
3,404,102 A 10/1968 Starcher et al.
3,475,266 A 10/1969 Strassel et al.
3,477,990 A 11/1969 Dante et al.
3,480,695 A * 11/1969 Hale ........................ C08L 69/00
428/412
3,491,111 A 1/1970 Lin
3,491,112 A 1/1970 Lin
3,491,116 A 1/1970 Lin
3,509,174 A 4/1970 Lin
3,553,119 A 1/1971 Wright et al.
3,578,615 A 5/1971 Moore et al.
3,624,107 A 11/1971 Lin
3,627,787 A 12/1971 Lin
3,641,011 A 2/1972 Lin et al.
3,642,828 A 2/1972 Farber et al.
3,681,390 A 8/1972 Lin (Continued)

FOREIGN PATENT DOCUMENTS

CA 2378191 A1 1/2001
CA 2280409 A1 * 2/2001

(Continued)

OTHER PUBLICATIONS

Supplemental Search Report for related application No. EP11769696 dated Jun. 20, 2014. (6 pages).

(Continued)

Primary Examiner — Marc A Patterson
(74) Attorney, Agent, or Firm — Patterson Theunte Pedersen, P.A.

(57) ABSTRACT

This invention provides a polymer that is useful in a variety of applications, including as a binder polymer of a coating composition, and especially a packaging coating composition. Packaging articles (e.g., containers) comprising the polymer and methods of making such packaging articles are also provided.

20 Claims, No Drawings

(56) References Cited

U.S. PATENT DOCUMENTS

| | | |
|---|---|---|
| 3,775,424 A | 11/1973 | Farber |
| 3,853,869 A | 12/1974 | Farber |
| 3,876,606 A | 4/1975 | Kehr |
| 3,879,348 A | 4/1975 | Serini et al. |
| 3,888,812 A * | 6/1975 | Plettner .................. 523/426 |
| 3,905,926 A | 9/1975 | D'Alelio |
| 3,920,510 A | 11/1975 | Hatano et al. |
| 3,943,187 A | 3/1976 | Wu |
| 3,950,451 A | 4/1976 | Suzuki et al. |
| 3,959,571 A | 5/1976 | Yahagi et al. |
| RE28,862 E * | 6/1976 | Siemonsen et al. .......... 215/255 |
| 3,971,808 A | 7/1976 | Baumann et al. |
| 3,984,363 A | 10/1976 | D'Alelio |
| 4,009,224 A | 2/1977 | Warnken |
| 4,011,184 A | 3/1977 | van Reijendam et al. |
| 4,051,195 A | 9/1977 | McWhorter |
| 4,076,676 A | 2/1978 | Sommerfeld |
| 4,076,764 A | 2/1978 | Bauer |
| 4,111,910 A | 9/1978 | Baggett |
| 4,122,060 A | 10/1978 | Yallourakis |
| 4,172,103 A | 10/1979 | Serini et al. |
| 4,173,594 A | 11/1979 | Dyslewski |
| 4,212,781 A | 7/1980 | Evans et al. |
| 4,247,439 A | 1/1981 | Matthews et al. |
| 4,283,428 A | 8/1981 | Birkmeyer |
| 4,285,847 A | 8/1981 | Ting |
| 4,333,809 A | 6/1982 | Schreckenberg et al. |
| 4,340,716 A * | 7/1982 | Hata ................... C08G 59/04 525/384 |
| 4,368,315 A | 1/1983 | Sikdar |
| 4,374,233 A | 2/1983 | Loucks et al. |
| 4,399,241 A | 8/1983 | Ting et al. |
| 4,413,015 A | 11/1983 | Anderson et al. |
| 4,446,258 A | 5/1984 | Chu et al. |
| 4,468,483 A | 8/1984 | Yeakey et al. |
| 4,476,262 A | 10/1984 | Chu et al. |
| 4,487,861 A | 12/1984 | Winner |
| 4,510,513 A | 4/1985 | Yamaguchi et al. |
| 4,517,322 A | 5/1985 | Birkmeyer et al. |
| 4,522,984 A * | 6/1985 | Watanabe et al. .......... 525/415 |
| 4,552,814 A | 11/1985 | Cavitt et al. |
| 4,564,655 A | 1/1986 | Liu |
| 4,600,737 A | 7/1986 | Georgalas et al. |
| 4,622,368 A | 11/1986 | Verbicky, Jr. et al. |
| 4,647,612 A | 3/1987 | Ranka et al. |
| 4,665,149 A | 5/1987 | Bertram et al. |
| 4,707,534 A | 11/1987 | Schultz |
| 4,729,983 A | 3/1988 | Satake et al. |
| 4,757,132 A * | 7/1988 | Brunelle ............ C08G 65/4081 528/176 |
| 4,794,102 A | 12/1988 | Petersen et al. |
| 4,794,156 A | 12/1988 | Ho et al. |
| 4,806,597 A | 2/1989 | Gallucci et al. |
| 4,849,502 A | 7/1989 | Evans et al. |
| 4,880,892 A | 11/1989 | Urano et al. |
| 4,963,602 A | 10/1990 | Patel |
| 4,994,217 A * | 2/1991 | Banevicius et al. ......... 264/45.9 |
| 5,010,147 A | 4/1991 | Westeppe et al. |
| 5,068,284 A | 11/1991 | Ullman et al. |
| 5,080,961 A | 1/1992 | Macy et al. |
| 5,102,608 A | 4/1992 | Frencken et al. |
| 5,115,082 A | 5/1992 | Mercer et al. |
| 5,162,406 A | 11/1992 | Meyer et al. |
| 5,201,436 A | 4/1993 | Owens et al. |
| 5,212,241 A | 5/1993 | Woo et al. |
| 5,264,503 A * | 11/1993 | Marx ................... C08G 59/621 525/109 |
| 5,288,839 A | 2/1994 | Greco |
| 5,296,525 A | 3/1994 | Spencer |
| 5,446,009 A | 8/1995 | Minami et al. |
| 5,494,950 A | 2/1996 | Asakage et al. |
| 5,496,921 A | 3/1996 | Sakashita et al. |
| 5,527,840 A | 6/1996 | Chutko et al. |
| 5,567,781 A | 10/1996 | Martino et al. |
| 5,571,907 A | 11/1996 | Sachinala et al. |
| 5,576,413 A | 11/1996 | Bussink et al. |
| 5,591,788 A | 1/1997 | Anderson et al. |
| 5,623,031 A | 4/1997 | Imura et al. |
| 5,677,398 A | 10/1997 | Motoshima et al. |
| 5,686,185 A | 11/1997 | Correll et al. |
| 5,718,352 A | 2/1998 | Diekhoff et al. |
| 5,718,353 A | 2/1998 | Kanfer et al. |
| 5,803,301 A * | 9/1998 | Sato .................. B21D 51/26 220/62.22 |
| 5,807,912 A | 9/1998 | Wu et al. |
| 5,811,498 A | 9/1998 | Perumal et al. |
| 5,830,952 A | 11/1998 | Pedersen et al. |
| 5,859,172 A | 1/1999 | Sakashita et al. |
| 5,872,196 A | 2/1999 | Murata et al. |
| 5,880,248 A | 3/1999 | Sakashita et al. |
| 5,916,933 A | 6/1999 | Johnson et al. |
| 5,922,817 A | 7/1999 | Pedersen et al. |
| 5,925,694 A | 7/1999 | Stengel-Rutkowski et al. |
| 5,994,462 A | 11/1999 | Srinivasan et al. |
| 6,008,273 A | 12/1999 | Leibelt et al. |
| 6,034,157 A | 3/2000 | Craun et al. |
| 6,043,333 A * | 3/2000 | Kuboki et al. .................. 528/98 |
| 6,048,931 A | 4/2000 | Fujita et al. |
| 6,060,577 A | 5/2000 | Davis |
| 6,133,402 A | 10/2000 | Coates et al. |
| 6,201,070 B1 * | 3/2001 | Kumabe ............. C07D 303/40 525/327.3 |
| 6,225,436 B1 | 5/2001 | Eiffler et al. |
| 6,242,533 B1 | 6/2001 | Kurimoto et al. |
| 6,306,934 B1 | 10/2001 | Bode et al. |
| 6,376,021 B1 | 4/2002 | Spellane |
| 6,382,454 B1 | 5/2002 | Buffard et al. |
| 6,399,738 B1 | 6/2002 | Ito |
| 6,451,926 B1 | 9/2002 | Kuo et al. |
| 6,469,127 B1 | 10/2002 | Furunaga et al. |
| 6,472,472 B2 | 10/2002 | Jung et al. |
| 6,566,426 B1 * | 5/2003 | Kanaida et al. ................. 524/96 |
| 6,576,718 B1 | 6/2003 | Yeager et al. |
| 6,579,829 B2 | 6/2003 | Nishimura et al. |
| 6,608,163 B2 | 8/2003 | Bailly et al. |
| 6,660,688 B2 | 12/2003 | Yamada et al. |
| 6,706,350 B2 | 3/2004 | Sato et al. |
| 6,777,464 B1 | 8/2004 | Watanabe et al. |
| 6,784,228 B2 * | 8/2004 | Ogura .................. C07D 311/78 523/466 |
| 6,794,445 B2 | 9/2004 | Reusmann et al. |
| 6,808,752 B2 | 10/2004 | Mallen |
| 6,833,398 B2 | 12/2004 | Agarwal et al. |
| 6,844,071 B1 | 1/2005 | Wang et al. |
| 6,894,093 B2 | 5/2005 | Bittner |
| 6,916,874 B2 | 7/2005 | Mazza et al. |
| 6,924,328 B2 | 8/2005 | Legleiter et al. |
| 6,984,262 B2 | 1/2006 | King et al. |
| 6,984,608 B2 | 1/2006 | Makitalo et al. |
| 7,022,765 B2 * | 4/2006 | Adedeji ................ C08F 255/00 525/68 |
| 7,037,584 B2 | 5/2006 | Wind et al. |
| 7,063,914 B2 | 6/2006 | Kawano et al. |
| 7,078,077 B2 | 7/2006 | Lynch et al. |
| 7,150,902 B2 | 12/2006 | Farha |
| 7,157,119 B2 | 1/2007 | Tang et al. |
| 7,189,787 B2 | 3/2007 | O'Brien et al. |
| 7,198,849 B2 | 4/2007 | Stapperfenne et al. |
| 7,208,538 B2 | 4/2007 | Taylor et al. |
| 7,256,228 B2 | 8/2007 | Agarwal et al. |
| 7,261,843 B2 | 8/2007 | Knox et al. |
| 7,262,261 B2 | 8/2007 | Brindopke et al. |
| 7,332,557 B2 | 2/2008 | Shinohara et al. |
| 7,332,560 B2 | 2/2008 | Heuer et al. |
| 7,397,139 B2 | 7/2008 | Ikezawa et al. |
| 7,446,234 B2 | 11/2008 | More et al. |
| 7,544,727 B2 | 6/2009 | Ikezawa et al. |
| 7,585,904 B2 | 9/2009 | Nakamura |
| 7,592,047 B2 | 9/2009 | O'Brien et al. |
| 7,619,056 B2 | 11/2009 | East et al. |
| 7,635,662 B2 | 12/2009 | Kabashima et al. |
| 7,666,953 B2 | 2/2010 | Nakamura et al. |
| 7,675,185 B2 | 3/2010 | Tendou et al. |
| 7,682,674 B2 | 3/2010 | Vogt et al. |

(56) References Cited

U.S. PATENT DOCUMENTS

| | | |
|---|---|---|
| 7,709,582 B2 | 5/2010 | Kouchi et al. |
| 7,803,439 B2 | 9/2010 | Crawford et al. |
| 7,803,440 B2 | 9/2010 | Crawford et al. |
| 7,820,772 B2 | 10/2010 | Usui et al. |
| 7,838,577 B2 | 11/2010 | Hayakawa et al. |
| 7,846,998 B2 | 12/2010 | Akagi et al. |
| 7,910,170 B2 | 3/2011 | Evans et al. |
| 7,915,743 B2 | 3/2011 | Ishizawa et al. |
| 7,981,511 B2 | 7/2011 | Maenaka et al. |
| 7,981,515 B2 | 7/2011 | Ambrose et al. |
| 7,985,522 B2 | 7/2011 | Tajima et al. |
| 8,013,052 B2 | 9/2011 | Nakamura et al. |
| 8,129,495 B2 | 3/2012 | Evans et al. |
| 8,142,858 B2 | 3/2012 | Cooke et al. |
| 8,168,276 B2 | 5/2012 | Cleaver et al. |
| 8,168,721 B2 | 5/2012 | Marsh et al. |
| 8,110,614 B2 | 7/2012 | Ito et al. |
| 8,449,960 B2 | 5/2013 | Skillman et al. |
| 8,465,846 B2 | 6/2013 | O'Brien et al. |
| 8,519,085 B2 | 8/2013 | Evans et al. |
| 8,927,075 B2 | 1/2015 | Gibanel et al. |
| 2003/0170396 A1 | 9/2003 | Yokoi et al. |
| 2003/0171527 A1 | 9/2003 | Burgoyne, Jr. |
| 2003/0181628 A1 | 9/2003 | Horn et al. |
| 2003/0203991 A1 | 10/2003 | Schottman et al. |
| 2003/0209553 A1 | 11/2003 | Horn et al. |
| 2003/0232145 A1 | 12/2003 | Inomata et al. |
| 2004/0044101 A1 | 3/2004 | Hirose et al. |
| 2004/0110908 A1* | 6/2004 | Idemura ............... C08G 59/22 525/530 |
| 2004/0171746 A1 | 9/2004 | Parekh et al. |
| 2004/0176563 A1 | 9/2004 | Shinohara et al. |
| 2004/0214916 A1 | 10/2004 | Bittner |
| 2004/0214926 A1 | 10/2004 | Bittner |
| 2004/0220372 A1 | 11/2004 | Qi et al. |
| 2005/0014004 A1 | 1/2005 | King et al. |
| 2005/0075465 A1 | 4/2005 | Bolle et al. |
| 2005/0090044 A1 | 4/2005 | Kayaba et al. |
| 2005/0090593 A1 | 4/2005 | Heuer et al. |
| 2005/0131195 A1 | 6/2005 | Asakage et al. |
| 2005/0196629 A1 | 9/2005 | Bariatinsky et al. |
| 2005/0215670 A1 | 9/2005 | Shimasaki et al. |
| 2006/0025559 A1 | 2/2006 | Wehrmann et al. |
| 2006/0052523 A1 | 3/2006 | Bushendorf et al. |
| 2006/0134541 A1 | 6/2006 | Fuji et al. |
| 2006/0142442 A1 | 6/2006 | Sherzer et al. |
| 2007/0036903 A1 | 2/2007 | Mayr et al. |
| 2007/0065589 A1 | 3/2007 | Florian |
| 2007/0065608 A1 | 3/2007 | Niederst |
| 2007/0087146 A1 | 4/2007 | Evans et al. |
| 2007/0099130 A1 | 5/2007 | Takahashi et al. |
| 2007/0141356 A1 | 6/2007 | Fugier et al. |
| 2007/0154643 A1 | 7/2007 | Schmid et al. |
| 2007/0281179 A1 | 12/2007 | Ambrose et al. |
| 2008/0009599 A1 | 1/2008 | East et al. |
| 2008/0033080 A1 | 2/2008 | Mader et al. |
| 2008/0171195 A1 | 7/2008 | Gothlich et al. |
| 2008/0193689 A1 | 8/2008 | Masselin et al. |
| 2008/0233390 A1 | 9/2008 | Gothlich et al. |
| 2008/0246173 A1 | 10/2008 | Braidwood et al. |
| 2008/0251757 A1 | 10/2008 | Yamamoto et al. |
| 2008/0319102 A1 | 12/2008 | Eckert et al. |
| 2008/0319156 A1 | 12/2008 | Fischer et al. |
| 2009/0036631 A1 | 2/2009 | Kaji et al. |
| 2009/0068473 A1 | 3/2009 | Van Wessel et al. |
| 2009/0088535 A1* | 4/2009 | Arita ................... C08G 59/063 525/390 |
| 2009/0092827 A1 | 4/2009 | Robinson |
| 2009/0158963 A1 | 6/2009 | O'Dell et al. |
| 2009/0247032 A1 | 10/2009 | Mori et al. |
| 2009/0280423 A1 | 11/2009 | Yahiro et al. |
| 2009/0281224 A1 | 11/2009 | Koh et al. |
| 2009/0326107 A1 | 12/2009 | Bittner |
| 2010/0056721 A1 | 3/2010 | Wright et al. |
| 2010/0056726 A1 | 3/2010 | Payot et al. |
| 2010/0068433 A1 | 3/2010 | Gibanel et al. |
| 2010/0086716 A1 | 4/2010 | Rüdiger et al. |
| 2010/0143681 A1 | 6/2010 | Yano et al. |
| 2010/0285309 A1 | 11/2010 | Barriau et al. |
| 2011/0042338 A1 | 2/2011 | Pecorini et al. |
| 2011/0160408 A1 | 6/2011 | de Brouwer et al. |
| 2011/0294921 A1 | 12/2011 | Smith |
| 2011/0315591 A1 | 12/2011 | Lespinasse et al. |
| 2012/0125800 A1 | 5/2012 | Doreau et al. |
| 2012/0149340 A1 | 6/2012 | Selph et al. |
| 2012/0165429 A1 | 6/2012 | Boutevin et al. |
| 2012/0172568 A1 | 7/2012 | Ueda |
| 2012/0282475 A1 | 11/2012 | Fuhry et al. |
| 2012/0301645 A1 | 11/2012 | Moussa et al. |
| 2012/0301646 A1 | 11/2012 | List et al. |
| 2012/0301647 A1 | 11/2012 | Moussa et al. |
| 2012/0302690 A1 | 11/2012 | Cunningham et al. |
| 2013/0052381 A1 | 2/2013 | Gallucci et al. |
| 2013/0196037 A1 | 8/2013 | O'Brien et al. |
| 2013/0206756 A1 | 8/2013 | Nierderst et al. |
| 2013/0280455 A1 | 10/2013 | Evans et al. |
| 2013/0316109 A1 | 11/2013 | Niederst et al. |
| 2013/0324652 A1 | 12/2013 | Pompignano et al. |
| 2014/0113093 A1 | 4/2014 | Corbin et al. |
| 2014/0378565 A1 | 12/2014 | Gelmont et al. |
| 2015/0021323 A1 | 1/2015 | Niederst et al. |
| 2015/0151878 A1 | 6/2015 | Niederst et al. |
| 2015/0197657 A1 | 7/2015 | Niederst et al. |
| 2015/0203713 A1 | 7/2015 | Niederst et al. |
| 2016/0027257 A1 | 1/2016 | Yoseloff et al. |
| 2016/0122581 A1 | 5/2016 | You et al. |
| 2016/0272576 A1 | 9/2016 | Gibanel et al. |

FOREIGN PATENT DOCUMENTS

| | | | |
|---|---|---|---|
| CA | 2570312 A1 | | 1/2006 |
| CA | 2280409 C | | 5/2008 |
| CN | 1360619 A | | 7/2002 |
| CN | 1402767 A | | 3/2003 |
| CN | 1935392 A | | 3/2007 |
| CN | 1976581 A | | 6/2007 |
| CN | 101096411 A | | 1/2008 |
| CN | 101244290 A | | 8/2008 |
| CN | 101370884 A | | 2/2009 |
| CN | 101484548 A | | 7/2009 |
| EP | 0265791 A2 | | 5/1988 |
| EP | 0475359 A2 | | 3/1992 |
| EP | 0620238 A2 | | 10/1994 |
| EP | 0185118 B1 | | 9/1995 |
| EP | 1333075 A1 | | 8/2003 |
| EP | 1818350 A1 | | 8/2007 |
| JP | S63165378 A | | 7/1988 |
| JP | S63304068 A | | 12/1988 |
| JP | 2002155727 | | 2/1990 |
| JP | H04366124 A | | 12/1992 |
| JP | 07-126574 A | | 5/1995 |
| JP | 3484546 B2 | | 5/1995 |
| JP | H07138502 A | | 5/1995 |
| JP | H07196770 | | 8/1995 |
| JP | 2008151428 | | 6/1996 |
| JP | 08-230328 | | 9/1996 |
| JP | H10316717 A | | 12/1998 |
| JP | 2000-005019 A | | 1/2000 |
| JP | 2000007757 A | | 1/2000 |
| JP | 2000007891 A | | 1/2000 |
| JP | 2001526716 A | | 12/2001 |
| JP | 2002-097250 A | | 4/2002 |
| JP | 2002097409 A | * | 4/2002 |
| JP | 2002-138245 A | | 5/2002 |
| JP | 2002155727 A | | 5/2002 |
| JP | 2002194274 A | | 7/2002 |
| JP | 2002206017 A | | 7/2002 |
| JP | 2002220563 | | 8/2002 |
| JP | 2002316963 A | | 10/2002 |
| JP | 2003012763 | | 1/2003 |
| JP | 2003176348 A | | 6/2003 |
| JP | 2003178348 A | | 6/2003 |
| JP | 2003183352 A | | 7/2003 |
| JP | 2004010874 A | | 1/2004 |

(56) References Cited

FOREIGN PATENT DOCUMENTS

| | | |
|---|---|---|
| JP | 2004053016 | 2/2004 |
| JP | 2005298594 A | 10/2005 |
| JP | 2005320446 A | 11/2005 |
| JP | 2006176658 | 7/2006 |
| JP | 2010064293 A | 3/2010 |
| KR | 100804293 B1 | 2/2008 |
| WO | WO-9526997 A1 | 10/1995 |
| WO | WO-97/28905 * | 8/1997 |
| WO | WO 00/71337 A1 | 11/2000 |
| WO | WO-0105901 A1 | 1/2001 |
| WO | WO-2004050740 A1 | 6/2004 |
| WO | WO-2007048094 A2 | 4/2007 |
| WO | WO-2007054304 A1 | 5/2007 |
| WO | 2008137562 A1 | 11/2008 |
| WO | 2009015493 A1 | 2/2009 |
| WO | WO-2009036790 A1 | 3/2009 |
| WO | WO-2009089145 A1 * | 7/2009 |
| WO | WO 2010/118349 A1 | 10/2010 |
| WO | WO-2010118356 A1 | 10/2010 |
| WO | WO-2010134608 A1 | 11/2010 |
| WO | 2011130671 A2 | 10/2011 |
| WO | 2012091701 A1 | 7/2012 |
| WO | 2012149340 A1 | 11/2012 |
| WO | 2012151184 A1 | 11/2012 |
| WO | 2012162298 A1 | 11/2012 |
| WO | 2012162299 A1 | 11/2012 |
| WO | 2013149234 A2 | 10/2013 |
| WO | 2013169459 A1 | 11/2013 |
| WO | WO 2014/140233 A1 | 9/2014 |
| WO | WO 2014/140234 A1 | 9/2014 |

OTHER PUBLICATIONS

Kitamura, Shigeyuki, et al., "Comparative Study of the Endocrine-Disrupting Activity of Bisphenol A and 19 Related Compounds," Toxicological Sciences, vol. 84, 249-259 (2005), doi:10.1093/toxcie/kfi074, Advance Access publication Jan. 5, 2005 (11 pages).

Zhongguo Liu, et al., "Preparation, characterization and thermal properties of tetramethylbisphenol F exposy resin and mixed systems," Polym Int 2012; 61: 565-570, © 2011 Society of Chemical Industry, published online in Wiley Online Library: Nov. 10, 2011 (6 pages).

Hong Fang, et al., "Quantitative Comparisons of in Vitro Assays for Estrogenic Activities," Environmental Health Perspectives, vol. 108, No. 8, Aug. 2000, 723-729 (7 pages).

Dr. William Stokes, CertiChem, Inc., "Test Method Nomination: MCF-7 Cell Proliferation Assay of Estrogenic Activity," Jun. 4, 2004 (102 pages).

Claude G. Matasa, et al, "A wish list for orthodontic materials, 2005," The Orthodontic Materials Insider, Dec. 2004, vol. 16 Nr. 4 (8 pages).

G. P. Moss, Extension and Revision of the Von Baeyer System for Naming Polycyclic Compounds (Including Bycyclic Compounds), IUPAC Recommendations 1999, Pure Appl. Chem., vol. 71, No. 3, pp. 513-529, 1999 (17 pages).

Kwang-Hoon Song, et al., "Endocrine Disrupter Bisphenol A Induces Orphan Nuclear Receptor Nur77 Gene Expression and Steroidogenesis in Mouse Testicular Leydig Cells," Endocrinology 143(6):2208-2215, Copyright 2002 by the Endocrine Society (8 pages).

Shigeki Kobayashi, et al., "Stereo Structure-Controlled and Electronic Structure-Controlled Estrogen-Like Chemicals to Design and Develop Non-estrogenic Bisphenol A Analogs Based on Chemical Hardness Concept," Chem. Pharm. Bull. 54(12) 1633-1638 (2006), Dec. 2006, 2006 Pharmaceutical Society of Japan (6 pages).

Nippon Kasei Chemical, "Flame Retardant Bisphenol F" (2 pages).

Eastman, "Eastman Tritan™ Copolyester—Lack of estrogen and testosterone activity," TRS-270, 4/10 (3 pages).

International Search Report and Written Opinion for related International Application No. PCT/US2011/032738 (13 pages).

DYTEK® A-Amine (2014) downloaded from the Oct. 16, 2014 Internet Archives capture at https://web.archive.org/web/20141016043145/http://dytek.invista.com/Products/Amines/dytek-a-amine.

Tice, R.R. "The single cell gel/comet assay: a microgel electrophoretic technique for the detection of DNA damage and repair in individual cells." Environmental Mutagenesis, Eds. Phillips, D.H and Venitt, S. Bios Scientific, Oxford, UD, pp. 315-339 (1995).

Woo, B. et al., Melt Polycondensation of Bisphenol A Polycarbonate by a Forced Gas Sweeping Process, Ind. Eng. Chem. Res., vol. 40, No. 5, pp. 1312-1319 (2001).

Polycarbonates, $4^{th}$-5th Edition, Kirk-Othmer Encyclopedia of Chemical Technology, pp. 1-30 (2000).

Porter, D. S. et al., Hot-Fill Containers, New Tech for OPP & PET, Plastics Technology, Eastman Chemical Co., 6 pages (Dec. 2007).

Grace Darex® Packaging Technologies, A Global Partner for your global business, Product Book, 4 pages (2006).

Mendum, T. et al., "Research Letter, Concentration of bisphenol A in thermal paper", Green Chemistry Letters and Reviews, vol. 4, No. 1, pp. 81-86 (Mar. 2011).

Matsumoto, S. et al., "The crystal structure of two new developers for high-performance thermo-sensitive paper: H-bonded network in urea-urethane derivatives", Dyes and Pigments, 85, pp. 139-142 (2010).

P.Vinas et al, "Comparison of two derivatization-based methods for solid-phase microextraction-gas chromotography-mass spectrometric determination of bisphenol A, bisphenol S. and bisphenol migarted from food cans," published online Feb. 3, 2010, Springer-Verlag, 2010. (11 pages).

"Poly(p-phenylene oxide)." Wikipedia: The Free Encyclopedia, <http://en.wikipedia.org/wiki/Poly(p-phenylene_oxide)> (accessed Apr. 6, 2015).

Fang, Hong, Weida Tong, Leming M. Shi, Robert Blair, Roger Perkins, William Branham, Bruce S. Hass, Qian Xie, Stacy L. Dial, Carrie L. Moland and Daniel M. Sheehan, "Structure-Activity Relationships for a Large Diverse Set of Natural, Synthetic, and Environmental Estrogens." Chem. Res. Toxicol. 2001, vol. 14, No. 3, pp. 280-294. (15 pages).

"Current Status of Testing Methods Development for Endocrine Distrupters." 6th Meeting of the Task Force on Edocrine Distrupters Testing and Assessment (EDTA) Jun. 24-25, 2002, Tokyo, Ministry of Economy, Trade and Industry, Japan. (70 pages).

Declaration of Dr. Larry B. Brandenburger under 37 C.P.R. §1.132 for Control No. 95/001,950 Concerning Inter Partes Reexamination of U.S. Pat. No. 8,092,876, 12 pages.

European Search Report for Application No. 17182623.3 dated Oct. 11, 2017, 8 pages.

European Search Report for European Application No. 12744671.4, dated Dec. 17, 2015, 5 pages.

European Search Report for European Application No. 12790169.2 dated Nov. 26, 2015, 5 pages.

Hashimoto Y., et al., "Measurement of Estrogenic Activity of Chemicals for the Development of New Dental Polymers," Toxicology in Vitro, 2001, vol. 15 (4-5), pp. 421-425.

International Preliminary Report on Patentability for Application No. PCT/US2011/032738, dated Oct. 26, 2012, 5 pages.

International Preliminary Report on Patentability for Application No. PCT/US2012/024191, dated Aug. 22, 2013, 9 pages.

International Preliminary Report on Patentability for Application No. PCT/US2012/024193, dated Aug. 22, 2013, 7 pages.

International Preliminary Report on Patentability for Application No. PCT/US2013/024960, dated Aug. 21, 2014, 9 pages.

International Search Report and Written Opinion for Application No. PCT/US2012/024191, dated Dec. 28, 2012, 13 pages.

International Search Report and Written Opinion for Application No. PCT/US2012/024193 dated Oct. 31, 2012, 9 pages.

International Search Report and Written Opinion for Application No. PCT/US2013/024960, dated May 31, 2013, 11 pages.

Parent Application, U.S. Appl. No. 13/651,796, Evans et al., filed Oct. 15, 2012.

(56) References Cited

OTHER PUBLICATIONS

Soto A.M., "Evidence of Absence: Estrogenicity Assessment of a New Food-Contact Coating and the Bisphenol Used in Its Synthesis," Environmental Science and Technology, 2017, vol. 51 (3), pp. 1718-1726.
Supplementary European Search Report for Application No. 13746877.3 dated Nov. 30, 2015, 8 pages.
Vogel S., "A Non-Estrogenic Alternative to Bisphenol A at Last?," Environmental Defense Fund, (A blog post dated Jan. 23, 2017), 3 pages.
Epoxy Resins, J.S. Massingill, pp. 393-424, Applied Polymer Science: 21st Century, 2000.
Application and File History for U.S. Appl. No. 13/570,743, filed Aug. 9, 2012, Inventors: Niederst, et al.
Application and File History for U.S. Appl. No. 14/616,175, filed Feb. 6, 2015, Inventors: Niederst, et al.
Application and File History for U.S. Appl. No. 15/773,093, filed May 2, 2018, Inventors: Evans, et al.
Application and File History for U.S. Appl. No. 16/057,469, filed Aug. 7, 2018, Inventors: Niederst, et al.
Application and File History for U.S. Appl. No. 16/161,677, filed Oct. 16, 2018, Inventors: Niederst, et al.
Application and File History for U.S. Appl. No. 16/384,263, filed Apr. 15, 2019, Inventors: Niederst, et al.
Application and File History for U.S.Appl. No. 13/570,632, filed Aug. 9, 2012, Inventors: Niederst, et al, 1250 pages.
Application and File History for U.S. Appl. No. 14/453,203, filed Aug. 6, 2014, Inventors: Niederst, et al, 572 pages.
Application and File History for U.S. Appl. No. 15/204,559, filed Jul. 7, 2016, Inventors: Niederst, et al, 195 pages.
Application and File History for U.S. Appl. No. 15/290,765, filed Oct. 11, 2016, Inventors: Niederst, et al, 215 pages.
Application and File History for U.S. Appl. No. 15/803,127, filed Nov. 3, 2017, Inventors: Evans, et al.
Application and File History for U.S. Appl. No. 15/803,657, filed Nov. 3, 2017, Inventors: Evans, et al.
Dow Chemical Company., "D.E.R.™ 661, Solid Epoxy Resin," Product Information, Form No. 296-01462-1007X-TD, 3 pages.
Examination Report for Indian Application No. 6558/DELNP/2013, dated Aug. 31, 2018, 8 pages.
Extended European Search Report for Application No. 18166398.0, dated Oct. 26, 2018, 6 pages.
Extended European Search Report for Application No. 15779232.6, dated Feb. 23, 2018, 13 pages.
Extended European Search Report for Application No. 18150643.7, dated Oct. 26, 2018, 6 pages.
Extended European Search Report for Application No. 19195021.1, dated Jan. 20, 2020, 7 pages.
Extended European Search Report for Application No. EP13827304, dated Mar. 21, 2016, 11 pages.
Extended European Search Report for Application No. EP16862969.9, dated Jul. 1, 2019, 7 pages.
Extended European Search Report for Application No. EP18197657.2, dated Mar. 18, 2019, 8 pages.
First Office Action dated Feb. 25, 2019 for Chinese Application No. 201710250900.5, 11 pages.
First Office Action dated Oct. 31, 2018 for Chinese Application No. 201610835512.9, 7 pages.
Flick E.W., "Epoxy Resins, Curing Agents, Compounds, and Modifiers—An Industrial Guide," Second Edition, 1993, 10 pages. available at http://www.daryatamin.com/uploads/Books%20File/Epoxy%20Resins,%20Curing%20Agents,%20Compounds,%20and%20Modifiers%20An%20Industrial%20Guide.pdf.
Guilin, et al., "Environmentally Friendly Paint Formulation Design," Chemical Industry Press, ISBN: 978-7-5025-9943-0, 2007, pp. 207-209 (6 pages).
International Preliminary Report on Patentability for Application No. PCT/US2013/054132, dated Feb. 19, 2015, 8 pages.
International Preliminary Report on Patentability for Application No. PCT/US2015/025723, dated Oct. 27, 2016, 11 pages.
International Preliminary Report on Patentability for Application No. PCT/US2016/060332, dated May 17, 2018, 8 pages.
International Search Report and Written Opinion for Application No. PCT/US2013/054132, dated Oct. 23, 2013, 10 pages.
International Search Report and Written Opinion for Application No. PCT/US2015/025723, dated Jun. 29, 2015, 16 pages.
International Search Report and Written Opinion for Application No. PCT/US2016/060332, dated Feb. 12, 2017, 10 pages.
Jungang G., "Kinetics of Epoxy Resins Formation from Bisphenol-A,Bisphenol-S, and Epichlorohydrin," Journal of Applied Polymer Science, vol. 48, 1993, pp. 237-241.
Manling S., "Application Principle and Technology of Epoxy Resin," China Machine Press, 2002, 16 pages (including 9 pages of translation).
Mesnage, et al., "Transcriptome Profiling Reveals Bisphenol A Alternatives Activate Estrogen Receptor Alpha in Human Breast Cancer Cells," Toxicological Sciences, 2017, vol. 158 (2), pp. 431-443.
Momentive Specialty Chemicals Inc.., "EPON™ and EPI-REZ™ Epoxy Resins," Product Selector, Aug. 2013, 16 pages.
Notice of Acceptance dated Oct. 17, 2020 for Australian Patent Application No. 2020201397, 4 pages.
Notice of Reasons for Refusal dated Mar. 27, 2018 for Japanese Application No. 2017-064686, 10 pages.
Notice of Reasons for Rejection for Japanese Patent Application No. 2019-112665, dated Aug. 24, 2018, 9 pages.
Notice of Reasons for Rejection dated Sep. 6, 2019 for Japanese Application No. 2013-552734, 5 pages.
Notice of Termination of Reconsideration by Examiners before Appeal Proceedings for Japanese Patent Application No. 2017-64686, dated Sep. 3, 2019, 2 pages.
Office Action dated Dec. 11, 2020 for Brazilian Application No. BR112013020026-0, 7 pages.
Office Action dated Mar. 13, 2020 for Brazilian Application No. BR122015001646-0, 7 pages.
Office Action for Brazilian Application No. BR112012026240-8, dated Aug. 6, 2020, 5 pages.
Office Action for Chinese Application No. 201610454406.6, dated Nov. 1, 2017, 6 pages.
Office Action for Indian Application No. 8654/DELNP/2012, dated Jan. 25, 2018, 7 pages.
Office Action dated Apr. 10, 2019 for Chinese Application No. 201580019708.4, 19 pages.
Office Action dated Jan. 7, 2021 for Chinese Application No. 201710250900.5, 8 pages.
Olin North America Epoxy Resins (2016) brochure available at: https://www.brenntag.com/media/documents/bsi/product_data_sheets/material_science/olin_epoxy_resins/olin_epoxy_resins_brochure.pdf, 12 pages.
Olsen C.M., et al., "Effects of the Environmental Oestrogens Bisphenol A, Tetrachlorobisphenol A, Tetrabromobisphenol A, 4-Hydroxybiphenyl and 4,4'-Dihydroxybiphenyl on Oestrogen Receptor Binding, Cell Proliferation and Regulation of Oestrogen Sensitive Proteins in the Human Breast Cancer Cell Line MCF-7," Pharmacology and Toxicology, Apr. 2003, vol. 92 (4), pp. 180-188.
Partial Supplementary European Search Report for Application No. 15779232.6, dated Oct. 17, 2017, 14 pages.
Ravdin, et al., "Estrogenic Effects of Phenolphthalein on Human Breast Cancer Cells In Vitro," Breast Cancer Research and Treatment, Jun. 1987, vol. 9 (2), pp. 151-154.
Report of Reconsideration by Examiner before Appeal for Japanese Patent Application No. 2017-64686, dated Aug. 29, 2019, 7 pages.
Rosenmai, et al., "Are Structural Analogues to Bisphenol a Safe Alternatives?," Toxicological Sciences, vol. 139 (1), 2014, pp. 35-47.
U.S. Food and Drug Administration, "Bisphenol A (BPA): Use in Food Contact Application," 9 pages, [retrieved on Dec. 28, 2017]. Retrieved from the Internet [URL: www.fda.gov/newsevents/publichealthfocus/ucm064437.htm].

* cited by examiner

COATING COMPOSITIONS FOR PACKAGING ARTICLES AND METHODS OF COATING

CROSS-REFERENCE TO RELATED APPLICATIONS

This application is a continuation of International Application No. PCT/US2011/032738 filed on Apr. 15, 2011 and entitled "COATING COMPOSITIONS FOR PACKAGING ARTICLES AND METHODS OF COATING," which itself claims the benefit of U.S. Provisional Application Ser. No. 61/324,997 filed on Apr. 16, 2010 and entitled "COATING COMPOSITIONS FOR CONTAINERS AND METHODS OF COATING" and U.S. Provisional Application Ser. No. 61/333,133 filed on May 10, 2010 and entitled "COATING COMPOSITIONS FOR CONTAINERS AND METHODS OF COATING," each of which is incorporated herein by reference in its entirety.

BACKGROUND

The application of coatings to metals to retard or inhibit corrosion is well established. This is particularly true in the area of packaging containers such as metal food and beverage cans. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food and beverage containers to prevent corrosion in the headspace of the container between the fill line of the food product and the container lid.

Packaging coatings should preferably be capable of high-speed application to the substrate and provide the necessary properties when hardened to perform in this demanding end use. For example, the coating should preferably be safe for food contact, not adversely affect the taste of the packaged food or beverage product, have excellent adhesion to the substrate, resist staining and other coating defects such as "popping," "blushing" and/or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

Various coatings have been used as interior protective can coatings, including polyvinyl-chloride-based coatings and epoxy-based coatings incorporating bisphenol A ("BPA"). Each of these coating types, however, has potential shortcomings. For example, the recycling of materials containing polyvinyl chloride or related halide-containing vinyl polymers can be problematic. There is also a desire by some to reduce or eliminate certain BPA-based compounds commonly used to formulate food-contact epoxy coatings.

What is needed in the marketplace is an improved binder system for use in coatings such as, for example, packaging coatings.

SUMMARY

This invention provides a coating composition useful in coating a variety of substrates, including metal substrates of packaging articles. In preferred embodiments, the coating composition is useful for coating one or more exterior or interior surfaces of a food or beverage container, or a portion thereof, including interior food-contact surfaces.

In preferred embodiments, the coating composition includes an effective amount (e.g., a film-forming amount) of a polymer, preferably a polyether polymer, that is free of structural units derived from bisphenol A ("BPA") or the diglycidyl ether of BPA ("BADGE"). In certain preferred embodiments, the polymer: (i) has a glass transition temperature ("Tg") of at least 70° C., and more preferably from 70 to 150° C. and/or (ii) includes at least one, and more preferably a plurality of polycyclic groups. In some embodiments, the polymer has a Tg of at least 70° C. and includes one or more polycyclic groups. In addition, the polymer preferably includes one or more segments of the below Formula I:

$$—O—Ar—(R_n—Ar)_n—O—, \quad (I)$$

wherein: each Ar is independently an aryl or heteroaryl group (typically a divalent arylene or heteroarylene group); each n is independently 0 or 1; R, if present, is a divalent organic group; and the two oxygen atoms depicted in Formula I are preferably each ether oxygen.

In some embodiments, the polyether polymer may have a Tg of less than 70° C. such as, for example, if the coating composition is intended for use on an outside surface of a food or beverage container or is intended for use in packaging food or beverage products that are not chemically aggressive.

R in Formula I, when present, can vary depending upon the particular requirements for the polymer. In some embodiments, R is preferably a group other than —C(CH$_3$)$_2$—. In some embodiments, R includes one or more quaternary carbon atoms, which may optionally be present in a cyclic group. In one such embodiment, R includes a cyclic group, more preferably a six-member carbon ring (e.g., a substituted or unsubstituted cyclohexane group, which is preferably divalent), even more preferably a six-member carbon ring where a carbon atom of the ring is a quaternary carbon atom present in a chain linking the pair of Ar groups. In some embodiments (e.g., where the segment of Formula I is derived from 1,1-bis(4-hydroxyphenyl)-3,3,5-trimethyl-cyclohexane, 1,1-di(4-hydroxyphenyl)-cyclohexane, or a substituted variant thereof), the quaternary carbon atom of the cyclic group may be directly attached to a carbon atom of each Ar group.

In preferred embodiments, the polymer includes secondary hydroxyl groups, and more preferably one or more —CH$_2$—CH(OH)—CH$_2$— segments, which are preferably derived from an oxirane.

Coating compositions of the present invention preferably include at least a film-forming amount of the polymer described herein and may optionally include additional ingredients such as, for example, an optional carrier and/or an optional crosslinker. If desired, the polymer and coating composition can be formulated to be suitable for use as a food-contact packaging coating. It is also contemplated that the coating composition may have utility in a variety of coating end uses outside of the food or beverage packaging coatings industry.

In one embodiment, the present invention provides a container including a food-contact surface, wherein at least a portion of the food-contact surface is coated with a coating composition described herein.

In one embodiment, a method of preparing a container that includes a substrate having a food-contact surface is provided. The method includes: providing a coating composition described herein, which preferably includes a liquid carrier; and applying the coating composition to at least a portion of the food-contact surface of the substrate prior to or after forming the substrate into a container. Typically the substrate is a metal substrate.

In one embodiment, a method of forming a food or beverage can or a portion thereof is provided that includes: applying a coating composition described herein to a metal substrate (e.g., applying the composition to the metal substrate in the form of a planar coil or sheet), hardening the composition, and forming the substrate into a food or beverage can or a portion thereof.

In certain embodiments, forming the substrate into an article includes forming the substrate into a can end or a can body. In certain embodiments, the article is a two-piece drawn food can, three-piece food can, food can end, closure for a food or beverage container, drawn and ironed food or beverage can, beverage can end, and the like. Suitable metal substrates include, for example, steel or aluminum.

In certain embodiments, the coating composition is substantially free of mobile and/or bound BPA and BADGE. More preferably, the coating composition is completely free of BPA and BADGE.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Definitions

As used herein, the term "organic group" means a substituted or unsubstituted hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups).

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The term "cyclic group" means a closed ring organic group that is classified as an alicyclic group or an aromatic group, both of which can include heteroatoms.

The term "alicyclic group" means a cyclic organic group having properties resembling those of aliphatic groups.

The term "polycyclic" when used in the context of a group refers to an organic group that includes at least two cyclic groups in which one or more atoms (and more typically two or more atoms) are present in the rings of both of the at least two cyclic groups. Thus, for example, a group that consists of two cyclohexane groups connected by a single methylene group is not a polycyclic group.

The term "tricyclic" group refers to a polycyclic group that includes three cyclic groups in which the ring of each cyclic group shares one or more atoms with one or both of the rings of the other cyclic groups.

The term "Ar" refers to a divalent aryl group (e.g., an arylene group), which refers to a closed aromatic ring or ring system such as phenylene, naphthylene, biphenylene, fluorenylene, and indenyl, as well as heteroarylene groups (i.e., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.)

A group that may be the same or different is referred to as being "independently" something.

The term "polyhydric phenol" as used herein refers broadly to any compound having at least two total hydroxyl groups each attached to one or more rings of one or more aryl or heteroaryl groups, more typically one or more phenylene groups. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

The term "phenylene" as used herein refers to a six-carbon atom aryl ring (e.g., as in a benzene group) that can have any substituent groups (including, e.g., hydrogen atoms, halogens, hydrocarbon groups, oxygen atoms, hydroxyl groups, etc.). Thus, for example, the following aryl groups are each phenylene rings: —$C_6H_4$—, —$C_6H_3$(CH$_3$)—, and —$C_6H(CH_3)_2Cl$—. In addition, for example, each of the aryl rings of a naphthalene group are phenylene rings.

The term "substantially free" of a particular mobile compound means that the recited polymer and/or composition contains less than 100 parts per million (ppm) of the recited mobile compound. The term "essentially free" of a particular mobile compound means that the recited polymer and/or composition contains less than 5 parts per million (ppm) of the recited mobile compound. The term "completely free" of a particular mobile compound means that the recited polymer and/or composition contains less than 20 parts per billion (ppb) of the recited mobile compound.

The term "mobile" means that the compound can be extracted from the cured coating when a coating (typically ~1 mg/cm$^2$ (6.5 mg/in$^2$) thick) is exposed to a test medium for some defined set of conditions, depending on the end use. An example of these testing conditions is exposure of the cured coating to HPLC-grade acetonitrile for 24 hours at 25° C. If the aforementioned phrases are used without the term "mobile" (e.g., "substantially free of BPA"), then the recited polymer and/or composition contains less than the aforementioned amount of the compound whether the compound is mobile in the coating or bound to a constituent of the coating.

The term "crosslinker" refers to a molecule capable of forming a covalent linkage between polymers or between two different regions of the same polymer.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Similarly, unless otherwise indicated, the use of a term designating a polymer class such as, for example, "polyether" is intended to include both homopolymers and copolymers (e.g., polyether-ester polymers).

The terms "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "a" polyether can be interpreted to mean that the coating composition includes "one or more" polyethers.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION OF ILLUSTRATIVE EMBODIMENTS

This invention provides a polymer preferably having: (i) a Tg of at least 70° C. and/or (ii) one or more polycyclic groups. In preferred embodiments, the polymer is a polyether polymer. For sake of convenience, the polymer of the present invention shall be referred to hereinafter as a polyether polymer.

The polyether polymer may have utility in a multitude of different end uses. In preferred embodiments, the polyether polymer is particularly useful as a binder polymer for a coating composition. Thus, in another aspect, the present invention provides a coating composition that preferably includes at least a film-forming amount of the polymer. Although any suitable cure mechanism may be used, thermoset coating compositions are preferred. Preferred coating compositions include one or more liquid carriers and are water-based and/or solvent-based coating compositions. Although coating compositions that include a liquid carrier are presently preferred, it is contemplated that the polyether polymer may have utility in other coating application techniques such as, for example, powder coating.

In preferred embodiments, the coating composition of the present invention is suitable for use as an adherent packaging coating and, more preferably, as a coating on an interior and/or exterior surface of a food or beverage container. Thus, in certain preferred embodiments, the coating composition is suitable for use as an interior food-contact coating. It is also well within the scope of the present invention to use the coating composition in drug-contact packaging applications such as, for example, on an interior surface of a metal metered dose inhaler can.

In preferred embodiments, the polyether polymer preferably includes one or more secondary hydroxyl groups attached to a backbone of the polymer, and more preferably a plurality of such groups. In preferred embodiments, the backbone includes one or more —$CH_2$—$CH(OH)$—$CH_2$— segments, which are preferably derived from an oxirane group. For example, such segments may be formed via reaction of an oxirane group and a hydroxyl group (more preferably a hydroxyl group of a polyhydric phenol).

If desired, the backbone of the polyether polymer may include step-growth or condensation linkages other than ether linkages (i.e., in addition to, or in place of, the ether linkages) such as, for example, amide linkages, carbonate linkages, ester linkages, urea linkages, urethane linkages, etc. In some embodiments, the backbone includes both ester and ether linkages.

In order to exhibit a suitable balance of coating properties for use as a food-contact coating, including suitable corrosion resistance when in prolonged contact with packaged food or beverage products, the polyether polymer preferably has a glass transition temperature ("Tg") of at least 60° C., more preferably at least 70° C., and even more preferably at least 80° C. In preferred embodiments, the Tg is less than 150° C., more preferably less than 130° C., and even more preferably less than 110° C. While not intending to be bound by any theory, it is believed that it is especially important that the polymer exhibit a Tg such as that described above in applications where the coating composition will be in contact with food or beverage products during retort processing at high temperature (e.g., at temperatures at or above about 100° C. and sometimes accompanied by pressures in excess of atmospheric pressure), and particularly when retorting products that are more chemically aggressive in nature. It is contemplated that in some embodiments, such as, for example, where the coating composition is intended for use as an exterior varnish on a food or beverage container, the Tg of the polymer may be less than that described above (e.g., as low as about 30° C.) and the coating composition may still exhibit a suitable balance of properties in the end use.

Preferred polyether polymers may have a backbone that includes any suitable terminal groups, including, for example, epoxy and/or hydroxyl groups (e.g., a hydroxyl group attached to a terminal aryl or heteroaryl group). The polymers may be made in a variety of molecular weights. Preferred polyether polymers have a number average molecular weight ("Mn") of at least 2,000, more preferably at least 3,000, and even more preferably at least 4,000. The molecular weight of the polymer may be as high as is needed for the desired application.

Depending upon the particular embodiment, the polyether polymer may be amorphous or at least semi-crystalline.

The polyether polymer can include branching, if desired. In preferred embodiments, however, the polyether polymer is a linear or substantially linear polymer.

In preferred embodiments, the polyether polymer includes a plurality of aryl or heteroaryl groups, with divalent aryl groups being presently preferred. Phenylene groups are particularly preferred. The aryl and/or heteroaryl groups may be present in the polymer in one or more segments of Formula I above, one or more other segments, or a combination thereof. In some embodiments, the polymer may be formed via reaction of ingredients that include one or more of: (i) a polyepoxide having one or more aryl or heteroaryl groups, (ii) a polyhydric phenol having one or more aryl or heteroaryl groups, or (iii) a comonomer having one or more aryl or heteroaryl groups.

While not intending to be bound by any theory, it is believed that the inclusion of a sufficient number of aryl and/or heteroaryl groups in the polyether polymer is an important factor for achieving suitable coating performance for food-contact coatings, especially when the product to be packaged is a so called "hard-to-hold" food or beverage product. Sauerkraut is an example of a hard-to-hold product. In preferred embodiments, aryl and/or heteroaryl groups constitute at least 20 weight percent ("wt-%"), more preferably at least 30 wt-%, and even more preferably at least 45 wt-% of the polymer, based on the total weight of aryl and heteroaryl groups in the polymer relative to the weight of the polymer. The upper concentration of aryl/heteroaryl groups is not particularly limited, but preferably the amount of such groups is configured such that the Tg of the polymer does not exceed the Tg ranges previously discussed. The total amount of aryl and/or heteroaryl groups in the polymer will typically constitute less than about 80 wt-%, more preferably less than about 70 wt-%, and even more preferably less than 60 wt-% of the polyether polymer. The total amount of aryl and/or heteroaryl groups in the polymer can be determined based on the weight of aryl- or heteroaryl-containing monomer incorporated into the polymer and the weight fraction of such monomer that constitutes aryl or heteroaryl groups.

In preferred embodiments, the polyether polymer includes one or more segments (and more preferably a plurality) of the below Formula I:

wherein:
each Ar is independently an aryl group (e.g., an arylene group) or heteroaryl group (e.g., heteroarylene group);
each n is independently 0 or 1;
R, if present, is a divalent organic group; with the proviso that in certain embodiments R is preferably a group other than —C(CH$_3$)$_2$—; and
the two oxygen atoms depicted in Formula I are each preferably ether oxygen (as opposed, e.g., to an oxygen of an ester linkage).

In Formula I, each Ar preferably has less than 20 carbon atoms, more preferably less than 11 carbon atoms, and even more preferably less than 8 carbon atoms. Preferably, each Ar has at least 4 carbon atoms, more preferably at least 5 carbon atoms, and even more preferably at least 6 carbon atoms. In certain embodiments, each Ar is a phenylene group. In certain embodiments, each Ar is a phenylene group of the formula —C$_6$(R$^1$)$_4$—, wherein each R$^1$ is independently hydrogen, a halogen, or an organic group, and wherein two R$^1$ groups can join to form an organic ring that can optionally contain one or more heteroatoms. Preferably, each R$^1$ is hydrogen.

The molecular weight of R in Formula I may be any suitable molecular weight. In certain preferred embodiments, R has a molecular weight of less than 500, less than 200, less than 150, or less than 100. In some embodiments, R has a molecular weight greater than that of a —C(CH$_3$)$_2$— group, or greater than 75.

In some embodiments, R of Formula I includes one or more cyclic groups (such as, for example, one or more alicyclic (which can optionally include heteroatoms), aryl, and/or heteroaryl groups). In some such embodiments, R of Formula I does not include one or both of: ester linkages or other step-growth linkages (e.g., condensation linkages). In some embodiments, R includes a divalent cyclic group of the structure —C$_6$(R$^2$)$_q$—, where: (i) q is from 2-10, more typically from 6-10, even more typically from 8-10, and even more typically 10, and (ii) each R$^2$ is independently hydrogen, a halogen, or an organic group (e.g., an alkyl group such as a methyl group, ethyl group, propyl group, etc.) and two R$^2$ groups may join to form a ring. The one or more cyclic groups can be present in a chain connecting the two Ar groups of Formula I or in a pendant group attached to the chain. Typically, the total number of atoms in the chain connecting the two Ar groups (not counting any hydrogen or substituent atoms attached to the chain) is less than 10, more typically less than 6, even more typically less than 3, and in some embodiments 1. In some embodiments, all of the atoms in the chain connecting the two Ar groups are carbon atoms.

In some embodiments, R of Formula I includes at least one carbon atom in a chain connecting the two Ar groups that is at least a tertiary carbon atom, and more preferably a quaternary carbon atom. In some such embodiments, R of Formula I is a segment of the following structure: —(X)$_r$—C(R$^3$)$_2$—(X)$_r$—, where: each X is independently a divalent organic group, which can optionally include one or more heteroatoms (e.g., O, N, S, Si); each R$^3$ is independently a hydrogen, a halogen, or an organic group; and wherein (i) at least one R$^3$ group (and more preferably both R$^3$ groups) is an organic group having at least one carbon atom and (ii) two R$^3$ groups can join to form a ring such as, for example, a six-membered ring (e.g., a six-member carbon ring which may be saturated or unsaturated, more typically saturated). A preferred example of such a ring group is a substituted or unsubstituted cyclohexane group (e.g., —C$_6$(R$^2$)$_{10}$— wherein: each R$^2$ is independently as previously described; and two R$^2$ groups may join to form a ring.)

Presently preferred materials for forming a segment of Formula I with an R having a quaternary carbon atom include 1,1-bis(4-hydroxyphenyl)-3,3,5-trimethyl-cyclohexane, 1,1-di(4-hydroxyphenyl)-cyclohexane, 1,1-di(4-hydroxy-3-methylphenyl)-cyclohexane, 1,1-di(4-hydroxy-3,5-dimethylphenyl)-cyclohexane, substituted variants thereof, and diepoxides thereof, whose structures are represented below.

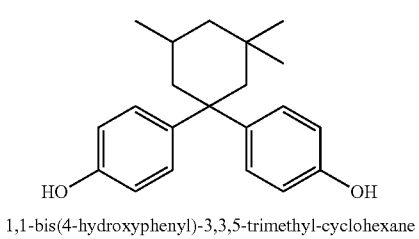

1,1-bis(4-hydroxyphenyl)-3,3,5-trimethyl-cyclohexane

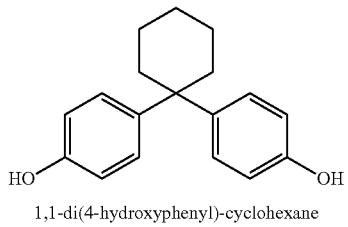

1,1-di(4-hydroxyphenyl)-cyclohexane

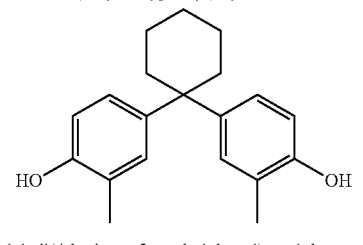

1,1-di(4-hydroxy-3-methylphenyl)-cyclohexane

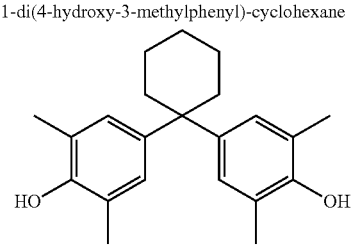

1,1-di(4-hydroxy-3,5-dimethylphenyl)-cyclohexane.

In certain preferred embodiments, the polyether polymer includes one or more of the above segments of Formula I where: each n is 1 and R includes one or more polycyclic groups. In another embodiment, R does not include a polycyclic group and the one or more polycyclic groups are either not present in the polymer or are included in different segments of the polymer.

In preferred embodiments, the polyether polymer includes a plurality of segments of Formula I, which are preferably dispersed throughout a backbone of the polymer, more preferably a polyether backbone. In preferred embodiments, the segments of Formula I constitute a substantial portion of the overall structural units of the polymer. Typically, segments of Formula I constitute, by weight percent, at least 10 wt-%, preferably at least 30 wt-%, and even more preferably at least 40 wt-% of the polymer. The weight percent of segments of Formula I in the polyether polymer may be below the amounts recited above in certain situations, and can even be substantially below. By way of example, the concentration of segments of Formula I may be outside the ranges recited above if the polyether polymer includes large molecular weight additional components such as may occur, for example, when the polymer is a copolymer such as an acrylic-containing copolymer (e.g., an acrylic-polyether copolymer formed by grafting acrylic onto a polyether polymer of the present invention). In such embodiments, the weight percent of segments of Formula I present in the polymer is as described above, based on the weight percent of segments of Formula I relative to the total polyether fraction of the polymer (while not considering the total weight of non-polyether portions such as, for example, acrylic portions). In general, the total polyether fraction of the polymer can be calculated based on the total weight of polyepoxide and polyhydric phenol reactants (e.g., a polyhydric monophenols and/or diphenols) incorporated into the polymer.

Any suitable reactants may be used to form the polyether polymer. In preferred embodiments, the polyether polymer is a reaction product of reactants including a polyepoxide compound (i.e., a compound having two or more oxirane groups) and a polyhydric phenol. The polyether polymer is typically a reaction product of one or more diepoxide compounds reacted with one or more dihydric phenol compounds.

Examples of suitable dihydric phenols for use in forming the polyether polymer include compounds of the below Formula II:

$$HO-Ar-(R_n-Ar)_n-OH, \qquad (II)$$

wherein Ar, R, and n are as defined above for Formula I. Thus, in some embodiments, compounds of Formula II may be used to incorporate segments of Formula I into the polymer of the invention. Examples of suitable dihydroxy phenols of Formula II include hydroquinone, catechol, resorcinol, 1,1-bis(4-hydroxyphenyl)-3,3,5-trimethyl-cyclohexane, 1,1-di(4-hydroxyphenyl)-cyclohexane, 1,1-di(4-hydroxy-3-methylphenyl)-cyclohexane, 1,1-di(4-hydroxy-3,5-dimethylphenyl)-cyclohexane, dihydroxynaphthalene, 4,4'-biphenol, diphenol compounds of the below Formula III, or a mixture thereof.

Polyether polymers of the present invention can be prepared by methods that involve advancing the molecular weight of compounds of Formula II. In certain embodiments, compounds of Formula II can be reacted with a polyepoxide (more preferably a diepoxide) to advance the molecular weight. For example, compounds of Formula II can be reacted with non-BPA based diepoxides to form polyether polymers preferably having secondary hydroxyl groups attached to the backbone that can be formulated with crosslinkers and additives for coatings for rigid packaging. Alternatively, compounds of Formula II can be reacted with epichlorohydrin to form a diepoxide analog of compounds of Formula II, which can then be reacted with other compounds of Formula II to form a polymer that includes —CH$_2$—CH(OH)—CH$_2$— segments. By way of example, a polyether polymer of the present invention can be formed by reacting 1,1-di(4-hydroxyphenyl)-cyclohexane (or a substituted variant thereof) with a diglycidyl ether of 1,1-di(4-hydroxyphenyl)-cyclohexane (or a substituted variant thereof). Conditions for such reactions are generally carried out using standard techniques that are known to one of skill in the art or that are exemplified in the Examples Section.

Any suitable technique may be used to produce diepoxide analogs of compounds of Formula II. For example, diepoxide analogs (e.g., glycidyl ethers or esters of the dihydric phenols) can be prepared by reacting the required proportions of a compound of Formula II (e.g., dihydric phenol) and epichlorohydrin in an alkaline medium. The desired alkalinity is typically obtained by adding basic substances, such as sodium or potassium hydroxide, preferably in stoichiometric excess to the epichlorohydrin. The reaction is preferably accomplished at temperatures of 50° C. to 150° C. The heating is typically continued for several hours to effect the reaction and the product is then washed free of salt and base. Procedures for such reactions are generally well known and disclosed, for example, in U.S. Pat. No. 2,633,458.

As used in the present invention, preferred diepoxides are BPA-free diepoxides, preferably with one or more ether linkages, and more preferably BPA-free diglycidyl ether compounds. It is also within the scope of the invention to use BPA-free diglycidyl ester compounds.

Examples of suitable diepoxides for use in forming the polyether polymer include diepoxide analogs of compounds of the above Formula II. Examples of such compounds include: the diglycidyl ester or diglycidyl ether of: hydroquinone, catechol, resorcinol, 1,1-bis(4-hydroxyphenyl)-3,3,5-trimethyl-cyclohexane, 1,1-di(4-hydroxyphenyl)-cyclohexane, 1,1-di(4-hydroxy-3-methylphenyl)-cyclohexane, 1,1-di(4-hydroxy-3,5-dimethylphenyl)-cyclohexane, dihydroxynaphthalene, 4,4'-biphenol, or a mixture thereof), 1,4-cyclohexanedimethanol diglycidyl ether (CHDMDGE), phthalic diglycidyl ester, terephthalic diglycidyl ester, isophthalic diglycidyl ester, hexahydrophthalic diglycidyl ester, neopentyl glycol diglycidyl ether, 2-methyl-1,3-propandiol diglycidyl ether, tetra methyl cyclobutanediol (e.g., 1,3-dihydroxy-2,2,4,4,tetramethylcyclobutane) diglycidyl ether, tricyclodecane dimethanol diglycidyl ether, diepoxides derived from the compound of the below Formula III, diepoxides derived from the compound of the below Formula VI, or derivatives or mixtures thereof.

having unsaturated (e.g., air oxidizable) reactive groups, or with acrylic acid or methacrylic acid to form free-radically curable polymers.

Advancement of the molecular weight of the polymer may also be enhanced by the reaction of an epoxy-terminated polymer of the present invention with a suitable diacid (such as adipic acid).

When intended for use in a food-contact coating or other application where good corrosion resistance is desired (e.g., certain drug-contact coatings such as used on the interior of metered dose inhaler containers), the diepoxide and compound of Formula II are preferably selected such that the resulting polymer exhibits a Tg within one of the preferred ranges previously described herein.

Table 1 below includes measured Tg values of polyether polymers produced from the indicated combinations of diepoxides and dihydric phenols. Each of the polymers had a number average molecular weight ("Mn") of from 3,000 to 6,000. The Tg values were measured via DSC using the methodology disclosed in the Test Methods section. Polyether polymers made from BPA and BADGE are included in Table 1 for comparison purposes. As previously discussed, preferred polymers of the invention are not derived from BPA or BADGE. Preferred polymers of Table 1 include those free of BPA and BADGE having a Tg of at least 70° C.

TABLE 1

| Tg (° C.) | Resorcinol | 4,4'-biphenol | BPA | 1,1-Bis(4-hydroxyphenyl)-3,3,5-trimethyl-cyclohexane | 1,1-di(4-hydroxyphenyl)-cyclohexane | 1,5-dihydroxy-naphthalene | 9-fluorene-bisphenol |
|---|---|---|---|---|---|---|---|
| NPGDGE | 8 | 9 | 16 | — | 25 | 32 | 59 |
| CHDMDGE | 19 | 30 | 31 | 60 | 38 | 41 | 72 |
| RDGE | — | 63 | 65 | 98 | 74/80* | 86 | 110 |
| BADGE | 74 | 87 | 78 | — | 85 | 96 | 106 |

*Two different samples were tested.
**NPDGE is neopentylglycol diglycidyl ether; CHDMDGE is cyclohexane dimethanol diglycidyl ether; RDGE is resorcinol diglycidyl ether; and BADGE is bisphenol A diglycidyl ether.

If desired, one or more comonomers and/or co-oligomers may be included in the reactants used to generate the polymer of the invention. Non-limiting examples of such materials include adipic acid, azelaic acid, terephthalic acid, isophthalic acid, and combinations thereof. The comonomers and/or co-oligomers may be included in the initial reaction mixture of polyepoxide and polyhydric phenol and/or may be post-reacted with the resulting polyether oligomer/polymer. In a presently preferred embodiment, a comonomer and/or co-oligomer is not utilized to produce the polyether polymer of the present invention.

Advancement of the molecular weight of the polyether polymer may be enhanced by the use of a catalyst in the reaction of a diepoxide (whether it be a diepoxide analog of Formula II or another diepoxide) with a compound of Formula II. Typical catalysts usable in the advancement of the molecular weight of the epoxy material of the present invention include amines, hydroxides (e.g., potassium hydroxide), phosphonium salts, and the like. A presently preferred catalyst is a phosphonium catalyst. The phosphonium catalyst useful in the present invention is preferably present in an amount sufficient to facilitate the desired condensation reaction.

Alternatively, epoxy-terminated polymers of the present invention may be reacted with fatty acids to form polymers Not shown in Table 1, a polyether polymer having a similar molecular weight to those of Table 1 was prepared from 1,1-di(4-hydroxy-3-methylphenyl)-cyclohexane and 4,4' butylidenebis(6-t-butyl-3-methylphenol) diglycidyl ether and the resulting polymer exhibited a Tg of 72° C.

As previously discussed, in some embodiments, the backbone includes both ester and ether linkages. In some such embodiments, the polyether polymer includes one or more segments of Formula I where R is a —$R^5_t$—C(O)—O—$R^4$—O—C(O)—$R^5_t$— segment, where: $R^4$ is a divalent organic group; each $R^5$, if present, is independently a divalent organic group; and each t is independently 0 or 1. In one such embodiment, $R^4$ includes at least one divalent cyclic group such as, for example, a divalent polycyclic group, a divalent aryl or heteroarylene group (e.g., a substituted or unsubstituted phenylene group) or a divalent alicyclic group (e.g., a substituted or unsubstituted cyclohexane or cyclohexene group). A further discussion of suitable segments containing ester linkages and materials for incorporating such segments into the polyether polymer is provided in U.S. Pat. No. 7,910,170.

An example of a suitable material for forming a segment of Formula I including a —$R^5_t$—C(O)—O—$R^4$—O—C(O)—$R^5_t$— segment having a polycyclic group in $R^4$ is a compound of the below Formula III, or a diepoxide analog thereof:

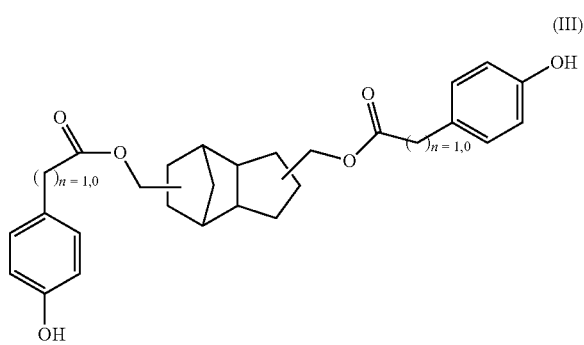

(III)

In an embodiment, the compound of Formula III is formed by reacting two moles of a phenol-containing compound having a hydroxyl group and a hydroxyl-reactive group (e.g. a carboxylic group) with one mole of a diol compound including a polycyclic group. One such example is the reaction product of 2 moles of 4-hydroxy phenyl acetic acid (HPAA) with 1 mole tricyclodecane dimethanol (TCDM), which yields a reaction product having a structure of Formula III.

In some embodiments, it may be advantageous to include one or more polycyclic groups in a backbone of the polyether polymer. In some such embodiments, one or more polycyclic groups are provided in R of Formula I. The polycyclic groups can be any suitable organic polycyclic groups. For example, the polycyclic groups may be saturated or unsaturated: bicyclic groups, tricyclic groups, or polycyclic groups consisting of four or more fused rings. Preferred polycyclic groups include bicyclic groups and tricyclic groups. The atoms of the rings of the polycyclic group are typically carbon atoms, although it is contemplated that the rings can include one or more heteroatoms (e.g., N, S, O, Si, etc.). In some embodiments, the polycyclic group includes at least one bridge having one or more atoms (typically one or more carbon atoms) located between the bridgehead atoms, where both (i) the one or more atoms are and (ii) the bridgehead atoms are shared by at least two rings. Thus, for example, bicyclo[4.4.0]decane does not include such a bridge, whereas norbornane does include such a bridge.

Some non-limiting examples of suitable polycyclic groups are provided below:

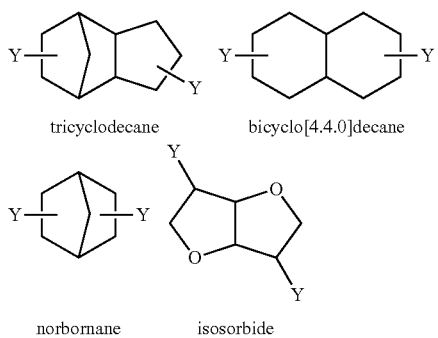

The above polycyclic groups are each represented as a divalent unit of the polymer (e.g., a divalent backbone unit) where each "Y" independently denotes another portion of the polymer that can be attached to any suitable atom of the polycyclic group (with the exception of the depicted isosorbide group) and where one Y may be an end group.

It is also contemplated that variants of any of the above polycyclic structures may be used such as, for example, substituted variants thereof or unsaturated variants thereof. An example of an unsaturated variant of a norbornane group is a norbornene group. Additional examples of suitable polycyclic groups for use in the polymer of the present invention are provided in PCT Application No. PCT/US2010/0030584 filed on Apr. 9, 2010 and entitled "Polymer Having Unsaturated Cycloaliphatic Functionality and Coating Compositions Formed Therefrom" and PCT Application No. PCT/US2010/0030576 filed on Apr. 9, 2010 and entitled "Polyester Coating Composition."

In some embodiments, the polymer may include one or more polycyclic groups that comprises an unsaturated structure that is at least bicyclic, more preferably bicyclic, and represented by the IUPAC (International Union of Pure and Applied Chemistry) nomenclature of Expression (IV) below:

$$\text{bicyclo}[x.y.z]\text{alkene} \tag{IV}$$

In Expression (IV), x is an integer having a value of 2 or more, y is an integer having a value of 1 or more, z is an integer having a value of 0 or more, and the term alkene refers to the IUPAC nomenclature designation (e.g., hexene, heptene, heptadiene, octene, etc.) for a given bicyclic molecule and denotes that that the bicyclic group includes one or more double bonds (more typically one or more carbon-carbon double bonds).

In certain preferred embodiments, z in Expression (IV) is 1 or more. In other words, such bicyclic groups include a bridge with a least one atom (typically one or more carbon atoms) interposed between a pair of bridgehead atoms, where the at least one atom is shared by at least two rings. By way of example, bicyclo[4.4.0]decane does not include such a bridge.

In certain preferred embodiments, x has a value of 2 or 3 (more preferably 2) and each of y and z independently have a value of 1 or 2.

The bicyclic structures represented by Expression (IV) include one or more carbon-carbon double bonds (e.g., 1, 2, 3, etc.). Non-limiting examples of some suitable unsaturated bicyclic groups represented by Expression (IV) include bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene.

It is contemplated that the bicyclic groups represented by Expression (IV) may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic group) or acyclic groups may be attached to the bicyclic group represented by Expression (IV). Thus, for example, in some embodiments the bicyclic group of Expression (IV) may be present in a tricyclic or higher group.

In some embodiments, some or all of the bicyclic groups of Expression (IV) may be saturated. Non-limiting examples of saturated bicyclics include saturated homologs of the structures represented by Expression (IV) (i.e., bicyclo[x.y.z]alkane, with x, y, and z as previously described) such as, for example, bicyclo[2.1.1]hexane, bicyclo[2.2.1]heptane, bicyclo[2.2.2]octane, and bicyclo[3.2.1]octane, bicyclo[4.3.2]undecane, bicyclo[5.2.0]nonane.

As discussed above, in some embodiments, the polyether polymer includes at least one polycyclic group or a plurality of polycyclic groups (e.g., ≥2, ≥3, ≥4, ≥5, ≥10, etc.). One useful measure for assessing the number of polycyclic groups in the polymer is the weight percent of the polycyclic groups relative to the total weight of the polymer. In certain embodiments, polycyclic groups constitute at least about 5, at least about 15, or at least about 25 wt-% of the polyether polymer. While the upper end is not especially limited, in some embodiments, the polycyclic groups constitute less than about 75, less than about 50, or less than about 35 wt-% of the polyether polymer. Caution should be exercised when interpreting the weight percent of polycyclic groups because direct measurement of the weight of the polycyclic groups may not be feasible. Accordingly, it may be necessary to determine the total amount of polycyclic groups present in the polymer by theoretical calculation based on the weight of polycyclic-containing monomer(s) incorporated into the polymer and the weight fraction of such monomer that constitutes polycyclic groups.

When present, the one or more polycyclic groups can be located at any position within the structure of the polymer (e.g., backbone and/or pendant locations).

The optional polycyclic groups can be incorporated into the polyether polymer using any suitable reactant or combination of reactants. For example, the polycyclic groups may be incorporated into the polymer using a polycyclic-containing polyepoxide and/or polyhydric phenol compound. It is also contemplated that one or more other polycyclic reactants may be used such as, for example, a polycyclic co-monomer having at least two functional groups preferably capable of reacting with a phenol hydroxyl group and/or an oxirane group to form a covalent linkage.

As previously discussed, in some embodiments, R of Formula I and/or II includes one or more polycyclic groups. In some such embodiments, R has the structure —$R^6$—Y— $R^6$— where each Y is a divalent organic group that includes at least one polycyclic group and each $R^6$ is independently a divalent organic group. In some embodiments, one or both $R^6$ groups include a step-growth polymer linkage such as, for example, an amide, carbonate, ester, ether, urea, or urethane linkage, with ester linkages being preferred. In one embodiment, each $R^6$ group includes an ester linkage.

By way of example, a polycyclic-containing compound of Formula II may be formed by reacting (a) a suitable amount (e.g., about 2 moles) of a Compound A having a phenol hydroxyl group and a carboxylic acid or other active hydrogen group with (b) a suitable amount (e.g., about 1 mole) of a di-functional or higher Compound B having one or more polycyclic groups and two or more active hydrogen groups capable of reacting with the active hydrogen group of Compound A. Examples of preferred Compounds A include 4-hydroxy phenyl acetic acid, 4-hydroxybenzoic acid, and derivatives or mixtures thereof. Examples of preferred Compounds B include polycyclic-containing diols such as tricyclodecane dimethanol (TCDM); nadic acid and/or anhydride; a polycyclic anhydrosugar such as isosorbide, isomannide, or isoidide; and derivatives or mixtures thereof. In some embodiments, the polycyclic group may be formed after reaction of Compounds A and B. For example, a Diels-Alder reaction (using, e.g., cyclopentadiene as a reactant) could be used to incorporate an unsaturated bicyclic group such as a norbornene group into Compound B, in which case Compound B in its unreacted form would need to include at least one non-aromatic carbon-carbon double bond in order to participate in the Diels-Alder reaction. For further discussion of suitable materials and techniques relating to such Diels-Alder reactions, see, for example, PCT Application No. PCT/US2010/0030584 filed on Apr. 9, 2010 and entitled "Polymer Having Unsaturated Cycloaliphatic Functionality and Coating Compositions Formed Therefrom" and PCT Application No. PCT/US2010/0030576 filed on Apr. 9, 2010 and entitled "Polyester Coating Composition." In some embodiments, it may be advantageous for the polyether polymer to include one or more polycyclic-containing backbone segments having the below structure (Formula V):

$$—Y—R^7—Y—; \tag{V}$$

where:
each Y is independently a polycyclic group;
$R^7$ is a divalent organic linking group (typically a substituted or unsubstituted hydrocarbyl linking group that may include one or more heteroatoms in the chain); and
the two polycyclic groups are preferably closely spaced.

While not intending to be bound by any theory, it is believed that the inclusion of such backbone segments in the polyether polymer may impart one or more beneficial coating properties for coatings incorporating the polymer. $R^7$ preferably has a chain length of 10 or less atoms (more preferably a chain length of ≤5, ≤4, ≤3, ≤2, or 1 atoms) in the backbone chain connecting the two X groups. In one embodiment, $R^7$ has the structure —$C(R^8)_2$— where each $R^8$ is independently a hydrogen, a halogen, or an organic group (e.g., a methyl group or a substituted or unsubstituted hydrocarbon group that can include one or more heteroatoms), and wherein the two $R^8$ groups can both be present in a ring group.

Segments having a structure of Formula V may be incorporated into a polymer of the present invention using any suitable compound. For example, a di-functional dimer compound of the following Formula VI may be used:

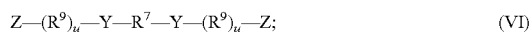
$$Z—(R^9)_u—Y—R^7—Y—(R^9)_u—Z; \tag{VI}$$

where:
Y and $R^7$ are as described above for Formula V;
each u is independently 0 or 1;
each $R^9$, if present, is independently a divalent organic group (more preferably a substituted or unsubstituted C1-C10 hydrocarbon group that can include one or more heteroatoms); and
each Z is independently a reactive functional group, more preferably a functional group capable of reacting with a complimentary functional group to form a step-growth linkage such as, for example, an amide, carbonate, ether, ester, urea, or urethane linkage. Hydroxyl groups and oxirane groups (e.g., an oxirane group of a glycidyl ether or glycidyl ester group) are preferred reactive functional groups.

An example of a representative compound of Formula VI is provided below:

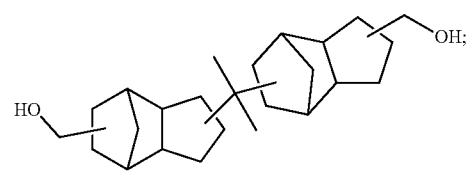

where the linking groups is a 2,2 isopropylidene group that can independently attach to any suitable carbon atom of the tricyclodecane groups. Oxirane functional groups may be included in the above compound of Formula VI by, for example, reacting the hydroxyl groups with epichlorohydrin.

In certain preferred compounds, each of Y and $R^7$ of Formulas V and VI are independently selected such that the unit length of the —Y—$R^7$—Y— structure is similar to that of a backbone epoxy unit produced by bisphenol A (e.g., within 30%, 20%, 10%, etc. of the unit length of bisphenol A).

The polyether polymers of the present invention can be applied to a substrate as part of a coating composition that includes a liquid carrier. The liquid carrier may be water, organic solvent, or mixtures of various such liquid carriers. Examples of organic solvents include glycol ethers, alcohols, aromatic or aliphatic hydrocarbons, dibasic esters, ketones, esters, and the like and mixtures thereof. Preferably, such liquid carriers are selected to provide a dispersion or solution of the polyether polymer for further formulation.

It is well within the scope of the present invention to formulate a packaging coating composition by substituting a polyether polymer described herein for any conventional epoxy polymer present in a packaging coating composition known in the art (including any of those disclosed in the patent publications referenced herein). Thus, for example, the polyether polymer of the present invention may be substituted, for example, for a BPA/BADGE-containing polymer of an epoxy/acrylic latex coating system, for a BPA/BADGE containing polymer of a solvent-based epoxy coating system, etc.

If a water-based system is desired, techniques may be used such as those described in U.S. Pat. Nos. 3,943,187; 4,076,676; 4,247,439; 4,283,428; 4,285,847; 4,413,015; 4,446,258; 4,476,262; 4,963,602; 5,296,525; 5,527,840; 5,830,952; 5,922,817; 6,034,157; 7,037,584; 7,189,787; and U.S. Patent App. No. 20100068433. Water-based coating systems of the present invention may optionally include one or more organic solvents, which will typically be selected to be miscible in water. The liquid carrier system of water-based coating compositions will typically include at least 50 wt-% of water, more typically at least 75 wt-% of water, and in some embodiments more than 90 wt-% or more than 95 wt-% of water. Any suitable means may be used to render the polyether polymer of the present invention miscible in water. For example, the polymer may include a suitable amount of salt groups such as ionic or cationic salt groups to render the polymer miscible in water (or groups capable of forming such salt groups). Neutralized acid or base group are preferred salt groups.

Thus, in one embodiment, a water-dispersible polymer of the present invention may be formed from preformed polymers (e.g., an oxirane-functional polymer preferably having at least one segment of Formula I and an acid-functional polymer) in the presence of a tertiary amine.

In another embodiment, a water-dispersible polymer of the present invention may be formed from an oxirane-functional polymer preferably having at least one segment of Formula I that is reacted with ethylenically unsaturated monomers to form an acid-functional polymer, which may then be neutralized, for example, with a tertiary amine. Thus, for example, in one embodiment a water-dispersible polymer preferably having at least one segment of Formula I may be formed pursuant to the acrylic polymerization teachings of U.S. Pat. Nos. 4,285,847 and/or 4,212,781. In another embodiment, acrylic polymerization may be achieved through reaction of ethylenically unsaturated monomers with unsaturation present in the polymer preferably containing at least one segment of Formula I. See, for example, U.S. Pat. No. 4,517,322 and/or U.S. Pat. Application No. 2005/0196629 by Bariatinsky, et al. for examples of such techniques.

If desired, an acid-functional polymer can be combined with an amine, more preferably a tertiary amine, to at least partially neutralize it prior to reaction with the oxirane-functional polymer preferably having at least one segment of Formula I.

In addition to water-based coating compositions, solvent-based epoxy-containing packaging coating compositions are known in the art. See, for example, U.S. Pat. Nos. 3,943,187 and 3,997,694, which disclose epoxy-containing solvent-based packaging coating compositions. In an embodiment, the coating composition of the present invention is an organic-solvent-based system that includes no more than a de minimus amount of water (e.g., less than about 2 wt-% of water).

In another embodiment, a polymer preferably containing segments of Formula I and including —$CH_2$—CH(OH)—$CH_2$— segments, which are derived from an oxirane, is reacted with an anhydride. This provides acid functionality which, when combined with an amine or other suitable base to at least partially neutralize the acid functionality, is water dispersible.

The amount of polyether polymer included in coating compositions of the present invention may vary widely depending on a variety of considerations such as, for example, the method of application, the presence of other film-forming materials, whether the coating composition is a water-based or solvent-based system, etc. For liquid-based coating compositions, however, the polyether polymer of the present invention will typically constitute at least about 10 wt-%, at least about 30 wt-%, or at least about 50 wt-% of the coating composition, based on the total weight of resin solids in the coating composition. For such liquid-based coating compositions, the polyether binder polymer will typically constitute less than about 90 wt-%, less than about 80 wt-%, or less than about 70 wt-% of the coating composition, based on the total weight of resin solids in the coating composition.

A coating composition of the present invention may also include other optional ingredients that do not adversely affect the coating composition or a cured coating composition resulting therefrom. Such optional ingredients are typically included in a coating composition to enhance composition esthetics; to facilitate manufacturing, processing, handling, and application of the composition; and to further improve a particular functional property of a coating composition or a cured coating composition resulting therefrom. For example, the composition that includes the polyether polymer of the present invention may optionally include crosslinkers, fillers, catalysts, lubricants, pigments, surfactants, dyes, toners, coalescents, extenders, anticorrosion agents, flow control agents, thixotropic agents, dispersing agents, antioxidants, oxygen-scavenging materials, adhesion promoters, light stabilizers, and mixtures thereof, as required to provide the desired film properties. Each optional ingredient is preferably included in a sufficient amount to serve its intended purpose, but not in such an amount to adversely affect a coating composition or a cured coating composition resulting therefrom.

Preferred polyether polymers and coating compositions of the present invention are substantially free of mobile and/or bound BPA and BADGE, and more preferably essentially free of these compounds, and most preferably completely free of these compounds.

It has been discovered that coating compositions using the aforementioned polymer-containing compositions may be formulated using one or more optional curing agents (i.e., crosslinking resins, sometimes referred to as "crosslinkers"). The choice of a particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker.

Preferred curing agents are substantially free of mobile BPA and BADGE and more preferably completely free of bound BPA and BADGE. Suitable examples of such curing agents are hydroxyl-reactive curing resins such as phenoplast and aminoplast.

Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, cyclopentylphenol, and compounds of Formula II.

Aminoplast resins are the condensation products of aldehydes such as formaldehyde, acetaldehyde, crotonaldehyde, and benzaldehyde with amino- or amido-group-containing substances such as urea, melamine, and benzoguanamine Examples of suitable aminoplast crosslinking resins include, without limitation, benzoguanamine-formaldehyde resins, melamine-formaldehyde resins, etherified melamine-formaldehyde, and urea-formaldehyde resins.

Examples of other generally suitable curing agents are blocked or non-blocked aliphatic, cycloaliphatic or aromatic di-, tri-, or poly-valent isocyanates, such as hexamethylene diisocyanate, cyclohexyl-1,4-diisocyanate, and the like.

Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have an Mn of at least about 300, more preferably at least about 650, and even more preferably at least about 1,000.

Polymeric blocked isocyanates may be used in certain embodiments. Some examples of suitable polymeric blocked isocyanates include a biuret or isocyanurate of a diisocyanate, a trifunctional "trimer," or a mixture thereof. Examples of suitable blocked polymeric isocyanates include TRIXENE BI 7951, TRIXENE BI 7984, TRIXENE BI 7963, TRIXENE BI 7981 (TRIXENE materials are available from Baxenden Chemicals, Ltd., Accrington, Lancashire, England); DESMODUR BL 3175A, DESMODUR BL3272, DESMODUR BL3370, DESMODUR BL 3475, DESMODUR BL 4265, DESMODUR PL 340, DESMODUR VP LS 2078, DESMODUR VP LS 2117, and DESMODUR VP LS 2352 (DESMODUR materials are available from Bayer Corp., Pittsburgh, Pa., USA); or combinations thereof. Examples of suitable trimers may include a trimerization product prepared from on average three diisocyanate molecules or a trimer prepared from on average three moles of diisocyanate (e.g., HMDI) reacted with one mole of another compound such as, for example, a triol (e.g., trimethylolpropane).

The level of curing agent (i.e., crosslinker) required will depend on the type of curing agent, the time and temperature of the bake, the molecular weight of the polyether polymer, and the desired film properties. If used, a crosslinker is typically present in an amount of up to 50 wt-%, preferably up to 30 wt-%, and more preferably up to 15 wt-%. If used, the crosslinker is preferably present in an amount of at least 0.1 wt-%, more preferably at least 1 wt-%, and even more preferably at least 1.5 wt-%. These weight percentages are based upon the total weight of the resin solids in the coating composition.

A coating composition of the present invention may also include other optional polymers that do not adversely affect the coating composition or a cured coating composition resulting therefrom. Such optional polymers are typically included in a coating composition as a filler material, although they can be included as a crosslinking material, or to provide desirable properties. One or more optional polymers (e.g., filler polymers) can be included in a sufficient amount to serve an intended purpose, but not in such an amount to adversely affect a coating composition or a cured coating composition resulting therefrom.

Such additional polymeric materials can be nonreactive, and hence, simply function as fillers. Such optional nonreactive filler polymers include, for example, polyesters, acrylics, polyamides, polyethers, and novalacs. Alternatively, such additional polymeric materials or monomers can be reactive with other components of the composition (e.g., an acid-functional polymer). If desired, reactive polymers can be incorporated into the compositions of the present invention, to provide additional functionality for various purposes, including crosslinking. Examples of such reactive polymers include, for example, functionalized polyesters, acrylics, polyamides, and polyethers. Preferred optional polymers are substantially free of mobile BPA and BADGE, and more preferably completely free of such compounds.

One preferred optional ingredient is a catalyst to increase the rate of cure. Examples of catalysts, include, but are not limited to, strong acids (e.g., dodecylbenzene sulphonic acid (DDBSA), available as CYCAT 600 from Cytec), methane sulfonic acid (MSA), p-toluene sulfonic acid (pTSA), dinonylnaphthalene disulfonic acid (DNNDSA), and triflic acid); quaternary ammonium compounds; phosphorous compounds; and tin, titanium, and zinc compounds; and mixtures thereof. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material in the coating composition. If used, a catalyst is preferably present in an amount of no greater than 3 wt-%, and more preferably no greater than 1 wt-%, based on the weight of nonvolatile material in the coating composition.

Another useful optional ingredient is a lubricant (e.g., a wax), which facilitates manufacture of fabricated metal articles (e.g. closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene type lubricants. If used, a lubricant is preferably present in the coating composition in an amount of at least 0.1 wt-%, and preferably no greater than 2 wt-%, and more preferably no greater than 1 wt-%, based on the total weight of nonvolatile material in the coating composition.

Another useful optional ingredient is a pigment, such as titanium dioxide. If used, a pigment is preferably present in the coating composition in an amount of no greater than 70 wt-%, more preferably no greater than 50 wt-%, and even more preferably no greater than 40 wt-%, based on the total weight of solids in the coating composition.

Surfactants can be optionally added to the coating composition to aid in flow and wetting of the substrate. Examples of surfactants, include, but are not limited to, nonylphenol polyethers and salts and similar surfactants known to persons skilled in the art. If used, a surfactant is preferably present in an amount of at least 0.01 wt-%, and more preferably at least 0.1 wt-%, based on the weight of resin solids. If used, a surfactant is preferably present in an amount no greater than 10 wt-%, and more preferably no greater than 5 wt-%, based on the weight of resin solids.

The coating composition of the present invention can be present as a layer of a mono-layer coating system or one or more layers of a multi-layer coating system. The coating composition can be used as a primer coat, an intermediate coat, a top coat, or a combination thereof. The coating thickness of a particular layer and the overall coating system will vary depending upon the coating material used, the substrate, the coating application method, and the end use for the coated article. Mono-layer or multi-layer coil coating systems including one or more layers formed from a coating composition of the present invention may have any suitable overall coating thickness, but will typically have an overall average dry coating thickness of from about 2 to about 60 microns and more typically from about 3 to about 12 microns.

The coating composition of the present invention may be applied to a substrate either prior to, or after, the substrate is formed into an article such as, for example, a food or beverage container or a portion thereof. In one embodiment, a method is provided that includes: applying a coating composition described herein to a metal substrate (e.g., applying the composition to the metal substrate in the form of a planar coil or sheet), hardening the composition, and forming (e.g., via stamping) the substrate into a packaging can or a portion thereof (e.g., a food or beverage can or a portion thereof). For example, riveted beverage can ends having a cured coating of the present invention on a surface thereof can be formed in such a process.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions of the present invention can be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If metal coil is the substrate to be coated, curing of the applied coating composition may be conducted, for example, by heating the coated metal substrate over a suitable time period to a peak metal temperature ("PMT") of preferably greater than about 350° F. (177° C.). More preferably, the coated metal coil is heated for a suitable time period (e.g., about 5 to 900 seconds) to a PMT of at least about 425° F. (218° C.).

The coating compositions of the present invention are particularly useful for coating metal substrates. The coating compositions may be used to coat packaging articles such as a food or beverage container, or a portion thereof. In preferred embodiments, the container is a food or beverage can and the surface of the container is the surface of a metal substrate. The polymer can be applied to a metal substrate either before or after the substrate is formed into a can (e.g., two-piece can, three-piece can) or portions thereof, whether it be a can end or can body. Preferred polymers of the present invention are suitable for use in food-contact situations and may be used on the inside of such cans. The coating compositions are particularly useful on the interior of two-piece or three-piece can ends or bodies.

The coating compositions may be suitable for spray coating, coil coating, wash coating, sheet coating, and side seam coating (e.g., food can side seam coating). A further discussion of such application methods is provided below. It is contemplated that coating compositions of the present invention may be suitably used in each of these application methods discussed further below, including the end uses associated therewith.

Spray coating includes the introduction of the coated composition into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then subjected to heat to remove any residual carriers (e.g., water or solvents) and harden the coating.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, and/or electromagnetic curing oven to harden (e.g., dry and cure) the coating. The residence time of the coated can within the confines of the curing oven is typically from 1 minute to 5 minutes. The curing temperature within this oven will typically range from 150° C. to 220° C.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as two-piece drawn food cans, three-piece food cans, food can ends, drawn and ironed cans, beverage can ends (including, e.g., riveted beverage can ends having a rivet for attaching a pulltab thereto), and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of coating, which protects the exposed "weld" from subsequent corrosion or other effects to the contained foodstuff. The coatings that function in this role are termed "side seam stripes." Typical side seam stripes are spray applied and cured quickly via residual heat from the welding operation in addition to a small thermal, ultraviolet, and/or electromagnetic oven.

Other commercial coating application and curing methods are also envisioned, for example, electrocoating, extrusion coating, laminating, powder coating, and the like.

In an embodiment, the coating composition of the present invention is an organic solvent-based composition preferably having at least 20 wt-% non-volatile components (i.e., "solids"), and more preferably at least 25 wt-% non-volatile components. In an embodiment, the coating composition is an organic solvent-based composition preferably having no greater than 40 wt-% non-volatile components (i.e., "solids"), and more preferably no greater than 35 wt-% non-volatile components. In such embodiments, the non-volatile film-forming components preferably include at least 50 wt-% of the polyether polymer of the present invention, more preferably at least 55 wt-% of the polymer, and even more preferably at least 60 wt-% of the polymer. In such embodiments, the non-volatile film-forming components preferably include no greater than 95 wt-% of the polyether polymer of the present invention, and more preferably no greater than 85 wt-% of the polymer.

In an embodiment, the coating composition is a water-based composition preferably having at least 15 wt-% non-volatile components (i.e., "solids"). In an embodiment, the coating composition is a water-based composition preferably having no greater than 50 wt-% non-volatile components (i.e., "solids"), and more preferably no greater than 40 wt-% non-volatile components. In such embodiments, the non-volatile film-forming components preferably include at least 25 wt-% of the polyether polymer of the present invention, more preferably at least 30 wt-% of the polymer, and more preferably at least 40 wt-% of the polymer. In such embodiments, the non-volatile film forming components preferably include no greater than 60 wt-% of the polyether polymer of the present invention, and more preferably no greater than 70 wt-% of the polymer.

In certain preferred embodiments, the coating composition of the present invention is capable of exhibiting one or more (and in some embodiments all) of the following coating properties: a blush resistance, corrosion resistance, stain resistance, and/or adhesion to metal substrate of at least 8, more preferably at least 9, and optimally 10 (10 being perfect), when subjected to the testing described below in the Examples section using 3 wt-% acetic acid in deionized water in place of the "Aggressive Food Product."

Some additional non-limiting embodiments of the present invention are provided below to further exemplify certain aspects of the present invention.

1. A coating composition that includes:
    a film-forming amount of a polyether polymer having a backbone that includes a polycyclic group (and more preferably a plurality of such groups);
    an optional crosslinker; and
    an optional carrier liquid.
2. The coating composition of embodiment 1, wherein the coating composition is at least substantially free of BPA or BADGE.
3. The coating composition of embodiment 1 or 2, wherein the polyether polymer includes one or more pendant hydroxyl groups attached to backbone carbon atoms.
4. The coating composition of any of embodiments 1-3, wherein the backbone includes —$CH_2$—$CH(OH)$—$CH_2$— segments.
5. The coating composition of any of embodiments 1-4, wherein aryl or heteroaryl groups constitute at least 20 weight percent of the polyether polymer, based on the total weight of aryl and heteroaryl groups present in the polymer relative to the weight of the polymer.
6. The coating composition of any of embodiments 1-5, wherein the backbone includes a plurality of ester linkages.
7. The coating composition of any of embodiments 1-6, wherein the polyether polymer includes one or more of the following segments of Formula I:

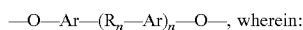
—O—Ar—$(R_n$—Ar$)_n$—O—, wherein:

each Ar is independently an aryl or heteroaryl group (more preferably a divalent phenylene group),
each n is independently 0 or 1,
R, if present, is a divalent organic group, and
the two oxygen atoms are each ether oxygen.
8. The coating composition of embodiment 7, wherein each n is 1 and R includes the polycyclic group.
9. The coating composition of embodiments 7 or 8, wherein R includes at least one ester linkage.
10. The coating composition of embodiment 9, wherein R includes a segment having the structure of the below Formula III:

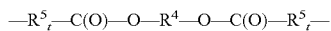
—$R^5_t$—C(O)—O—$R^4$—O—C(O)—$R^5_t$— wherein:
$R^5$ is a divalent organic group that includes a polycyclic group;
each $R^4$ is a divalent organic group; and
each t is 0 or 1.
11. The coating composition of any of embodiments 1-10, wherein the polyether polymer has a glass transition temperature (Tg) of at least about 30° C., more preferably about 50° C., and even more preferably at least about 70° C., even more preferably from about 80° C. to 110° C.
12. The coating composition of any of embodiments 1-11, wherein the coating composition includes the liquid carrier and the polyether polymer has a number average molecular weight of at least 2,000.
13. The coating composition of any of embodiments 1-12, wherein the polyether polymer is a reaction product of ingredients including a polyepoxide and a polyhydric phenol, more preferably a diepoxide and a dihydric phenol.
14. The coating composition of embodiment 13, wherein one or both of the polyepoxide and the polyhydric phenol includes a polycyclic group.
15. The coating composition of any of embodiments 1-14, wherein the polycyclic group includes a tricyclodecane group.

16. The coating composition of embodiment 13, wherein one or both of the polyepoxide or polyhydric phenol is derived from isosorbide.

17. The coating composition of any of embodiments 1-16, wherein the coating composition is a water-based system.

18. The coating composition of any of embodiments 1-17, wherein the coating composition is a solvent-based system.

19. The coating composition of any of embodiments 1-18, wherein the coating composition is suitable for use as a food-contact coating.

20. An article having the coating composition of any one of embodiments 1-19 applied to at least a portion of a surface thereof.

21. The article of claim 20, wherein the article is a metal food or beverage container or a portion thereof.

22. A method, including:
providing a metal substrate;
providing a coating composition of any of embodiments 1-19; and
applying the coating composition on at least a portion of a major surface of the substrate prior to, or after, forming the substrate into a food or beverage container or a portion thereof.

23. A coating composition including:
a polyether polymer (preferably in a film-forming amount) having:
one or more segment of the following Formula I:

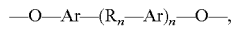

—O—Ar—(R$_n$—Ar)$_n$—O—, wherein:
each Ar is independently an aryl or heteroaryl group (more preferably a divalent phenylene group),
each n is independently 0 or 1,
R, if present, is a divalent organic group, and
the two oxygen atoms are each ether oxygen; and
preferably having a glass transition temperature (Tg) of at least 30° C., more preferably at least 50° C., and even more preferably at least 70° C.; and
wherein the coating composition is at least substantially free of BPA or BADGE.

24. The coating composition of embodiment 23, wherein R, if present, is not —C(CH$_3$)$_2$—.

25. The coating composition of embodiments 23 or 24, wherein the polyether polymer has a Tg from 70 to 150° C.

26. The coating composition of any of embodiments 23-25, wherein the polyether polymer has a Tg of from 80 to 110° C.

27. The coating composition of any of embodiments 23-26, wherein the polyether polymer includes one or more pendant hydroxyl groups attached to backbone carbon atoms.

28. The coating composition of any of embodiments 23-27, wherein a backbone of the polyether polymer includes —CH$_2$—CH(OH)—CH$_2$— segments.

29. The coating composition of any of embodiments 23-28, wherein aryl or heteroaryl groups constitute at least 20 wt-% of the polyether polymer, based on the total weight of aryl and heteroaryl groups present in the polymer relative to the weight of the polymer.

30. The coating composition of any of embodiments 23-29, wherein the polyether polymer is a reaction product of ingredients including a polyepoxide and a polyhydric phenol, more preferably a diepoxide and a dihydric phenol.

31. The coating composition of any of embodiments 23-30, wherein each of the polyepoxide and the polyhydric phenol independently include an aryl or heteroaryl group.

32. The coating composition of any of embodiments 23-31, wherein one or more of the polyepoxide or polyhydric phenol are selected from: 1,1-di(4-hydroxyphenyl)-cyclohexane, 1,1-di(4-hydroxy-3-methylphenyl)-cyclohexane, 1,1-di(4-hydroxy-3,5-dimethylphenyl)-cyclohexane, a mixture thereof, the diglycidyl ether of any of these, or combinations thereof.

33. The coating composition of any of embodiments 23-32, wherein one or more of the polyepoxide or polyhydric phenol are selected from: 1,1-bis(4-hydroxyphenyl)-3,3,5-trimethyl-cyclohexane, the diglycidyl ether of 1,1-bis(4-hydroxyphenyl)-3,3,5-trimethyl-cyclohexane, or combinations thereof.

33.5. The coating composition of any of embodiments 23-33, wherein the polyether polymer has a number average molecular weight at least 2,000.

34. The coating composition of any of embodiments 23-33.5, wherein n is 1 and R includes a quaternary carbon atom in a backbone segment of R connecting the two Ar groups depicted in Formula I.

35. The coating composition of any of embodiments 23-34, wherein R includes at least one cyclic group.

36. The coating composition of embodiment 35, wherein the cyclic group is a pendant or backbone alicyclic group.

37. The coating composition of embodiments 35 or 36 wherein the cyclic group includes a six-member carbon ring (e.g., a —C$_6$(R$^2$)$_q$— cyclic group where: (i) q is from 2 to 10, more typically from 6-10, even more typically from 8-10, and even more typically 10 and (ii) each R$^2$ group is independently hydrogen, a halogen, or an organic group and two R$^2$ groups may join to form a ring.

38. The coating composition of any of embodiments 35-37, wherein the cyclic group is a substituted or unsubstituted divalent cyclohexane group.

39. The coating composition of any of embodiments 35-38, wherein the cyclic group includes a quaternary carbon atom present in a backbone chain of R connecting the two Ar groups of Formula I.

40. The coating composition of any of embodiments 35-39, wherein R of Formula I does not include any ester linkages in a backbone chain of R connecting the two Ar groups.

41. The coating composition of any of embodiments 23-40, wherein the polyether polymer includes a plurality of ester linkages.

42. The coating composition of any of embodiments 23-39 and 41, wherein n is 1 and R includes at least one ester linkage.

43. The coating composition of embodiment 42, wherein R comprises a segment having the structure of the below Formula III:

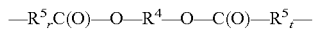

—R$^5{}_t$C(O)—O—R$^4$—O—C(O)—R$^5{}_t$— wherein:
R$^4$ is a divalent organic group;
each R$^5$ is a divalent organic group; and
each t is 0 or 1.

44. The coating composition of embodiment 43, wherein R$^4$ includes at least one divalent aryl or heteroaryl group.

45. The coating composition of any of embodiments 23-40, wherein the polyether polymer is free of ester linkages.

46. The coating composition of any of embodiments 23-45, wherein the coating composition is a water-based system.

47. The coating composition of any of embodiments 23-45, wherein the coating composition is a solvent-based system.

48. The coating composition of any of embodiments 23-47, wherein the coating composition is suitable for use as a food-contact coating.

49. An article including a metal substrate of a food or beverage container, or a portion thereof, and a coating composition of any of embodiments 23-48 applied on at least a portion of a major surface of the metal substrate.

50. A method, comprising:
providing a metal substrate;
providing a coating composition of any of embodiments 23-48; and
applying the coating composition on at least a portion of a major surface of the substrate prior to, or after, forming the substrate into a food or beverage container or a portion thereof.

51. The method of embodiment 50, further comprising:
forming the metal substrate having the coating composition applied thereon into a food or beverage container or a portion thereof.

52. The method of embodiment 50, wherein the metal substrate includes a portion of a preformed food or beverage container.

53. The method of any of embodiments 50-52, wherein the major surface includes a food-contact surface.

54. The coating composition, method, or article of any of embodiments 1-53, wherein the polyether polymer includes at least: 1 wt-%, 5 wt-%, 10 wt-%, 20 wt-%, 30 wt-%, or 50 wt-% of the segments of Formula I.

Test Methods

Unless indicated otherwise, the following test methods were utilized in the Examples that follow.

Differential Scanning Calorimetry

Samples for differential scanning calorimetry ("DSC") testing were prepared by first applying the liquid resin composition onto aluminum sheet panels. The panels were then baked in a Fisher Isotemp electric oven for 20 minutes at 300° F. (149° C.) to remove volatile materials. After cooling to room temperature, the samples were scraped from the panels, weighed into standard sample pans and analyzed using the standard DSC heat-cool-heat method. The samples were equilibrated at −60° C., then heated at 20° C. per minute to 200° C., cooled to −60° C., and then heated again at 20° C. per minute to 200° C. Glass transitions were calculated from the thermogram of the last heat cycle. The glass transition was measured at the inflection point of the transition.

Adhesion

Adhesion testing is performed to assess whether the coating adheres to the coated substrate. The adhesion test was performed according to ASTM D 3359—Test Method B, using SCOTCH 610 tape (available from 3M Company of Saint Paul, Minn.). Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of "10" indicates no blush and a rating of "0" indicates complete whitening of the film. Blush ratings of at least 7 are typically desired for commercially viable coatings and optimally 9 or above.

Corrosion Resistance

Corrosion resistance is a measure of a coatings ability to resist a corrosive/acidic environment. It is generally measured on a scale of 0-10. A "0" indicates the coating is completely corroded, observed by bubbling or blistering of the film in all areas. A "10" indicates the coating is unchanged from before it was subjected to the corrosive environment.

Stain Resistance

Stain resistance is a measure of a coating's ability to resist staining by a media. It is generally measured on a scale of 0-10. A "0" indicates that the coating is completely stained with a complete color change of the film observed in all areas. A "10" indicates that the coloration of the coating is unchanged from before it was subjected to the staining environment.

Solvent Resistance Test

The extent of "cure" or crosslinking of a coating is measured as a resistance to solvents, such as methyl ethyl ketone (MEK) or isopropyl alcohol (IPA). This test is performed as described in ASTM D5402-93. The number of double-rubs (i.e., one back-and-forth motion) is reported. Preferably, the MEK solvent resistance is at least 30 double rubs.

EXAMPLES

The following examples are offered to aid in understanding of the present invention and are not to be construed as limiting the scope thereof. Unless otherwise indicated, all parts and percentages are by weight.

List of Raw Materials and Ingredients

The following table lists some of the raw materials and ingredients used in the following examples. Alternative materials or suppliers may be substituted as is appreciated to one skilled in the art.

| Raw Material | Supplier | Location |
|---|---|---|
| PHENODUR PR 612 phenolic crosslinker | Cytec | Smyrna, Georgia |
| ERISYS GE-22 cyclohexane dimethanol diglycidyl ether | CVC Thermoset Specialties | Moorestown, NJ |
| 1,1-Bis(4-hydroxyphenyl)-3,3,5-trimethyl-cyclohexane | Honshu Chemical | Tokyo, Japan |
| CATALYST 1201 polymerization catalyst | Shell | Houston, Texas |
| 1,1-di(4-hydroxyphenyl)-cyclohexane | Honshu Chemical | Tokyo, Japan |
| ERISYS resorcinol diglycidyl ether | CVC Thermoset Specialties | Moorestown, NJ |
| EPON 828 bisphenol A diglycidyl ether | Hexion | Houston, Texas |
| Bisphenol A | Dow Chemical | Midland, MI |

Example 1

Polyether Polymers

Run 1:

To a 4-neck round-bottom flask equipped with a mechanical stirrer, a water-cooled condenser, and a thermocouple connected to a heating control device and a heating mantle were added 138.4 parts of ERISYS GE-22, 140.3 parts of 1,1-Bis(4-hydroxyphenyl)-3,3,5-trimethyl-cyclohexane, 0.26 parts CATALYST 1201 and 13.4 parts of methylisobutylketone. Stirring and heating were begun and continued until the batch reached 130° C., at which time heating was discontinued and the batch was allowed to exotherm to 158° C. The batch was heated at 155° C. for 180 minutes, at which time the epoxy value was 0.038 equivalents/100 grams. At this time heating was discontinued as 84.2 parts ethylene glycol butyl ether were added slowly, followed by 42.1 parts butanol. The final resin had a nonvolatile content of 66.9%, an epoxy value of 0.036, a Brookfield viscosity of 75,000 Centipoise at 80° F. (~27° C.), and a Tg of 60° C. Based on a theoretical calculation, the final resin included 20.6 wt-% of aryl groups, based on the total weight of aryl groups in the polymer relative to the weight of the polymer.

Run 2:

To a 4-neck round-bottom flask equipped with a mechanical stirrer, a water-cooled condenser, and a thermocouple connected to a heating control device and a heating mantle were added 169.8 parts of ERISYS GE-22, 130.2 parts of 1,1-di(4-hydroxyphenyl)-cyclohexane, 0.30 parts catalyst 1201 and 15.9 parts of methylisobutylketone. Stirring and heating were begun and continued until the batch reached 125° C., at which time heating was discontinued and the batch was allowed to exotherm to 166° C. The batch was heated at 155° C. for 120 minutes, at which time the epoxy value was 0.035 equivalents/100 grams. At this time heating was discontinued as 122 parts ethylene glycol butyl ether were added slowly, followed by 60.6 parts butanol. The final resin had a nonvolatile content of 60.2%, an epoxy value of 0.035, and a Tg of 38° C. Based on a theoretical calculation, the final resin included 24.6 wt-% of aryl groups, based on the total weight of aryl groups in the polymer relative to the weight of the polymer.

Run 3:

To a 4-neck round-bottom flask equipped with a mechanical stirrer, a water cooled condenser, and a thermocouple connected to a heating control device and a heating mantle were added 233.4 parts of RDGE, 266.6 parts of 1,1-Bis(4-hydroxyphenyl)-3,3,5-trimethyl-cyclohexane, 0.5 parts CATALYST 1201 and 26.3 parts of methylisobutylketone. Stirring and heating were begun and continued until the batch reached 130° C., at which time heating was discontinued and the batch was allowed to exotherm to 162° C. The batch was heated at 155° C. for 60 minutes, at which time the epoxy value was 0.034 equivalents/100 grams. At this time heating was discontinued as 205.6 parts ethylene glycol butyl ether were added slowly, followed by 101.2 parts butanol. The final resin had a nonvolatile content of 59.6%, an epoxy value of 0.031, and a Tg of 98° C. Based on a theoretical calculation, the final resin included 42 wt-% of aryl groups, based on the total weight of aryl groups in the polymer relative to the weight of the polymer.

Run 4:

To a 4-neck round-bottom flask equipped with a mechanical stirrer, a water cooled condenser, and a thermocouple connected to a heating control device and a heating mantle were added 250.7 parts of RDGE, 249.3 parts of 1,1-di(4-hydroxyphenyl)-cyclohexane, 0.50 parts CATALYST 1201 and 33.5 parts of methylisobutylketone. Stirring and heating were begun until the batch reached 125° C., at which time heating was discontinued and the batch was allowed to exotherm to 171° C. The batch was heated at 155° C. for 45 minutes, at which time the epoxy value was 0.037 equivalents/100 grams. At this time heating was discontinued as 205 parts ethylene glycol butyl ether were added slowly, followed by 101 parts butanol. The final resin had a nonvolatile content of 60.2%, an epoxy value of 0.032, and a Tg of 80° C. Based on a theoretical calculation, the final resin included 45.4 wt-% of aryl groups, based on the total weight of aryl groups in the polymer relative to the weight of the polymer.

Comparative Run 5:

To a 4-neck round-bottom flask equipped with a mechanical stirrer, a water cooled condenser, and a thermocouple connected to a heating control device and a heating mantle were added 259.8 parts of EPON 828, 140.3 parts of Bisphenol A, 0.4 part CATALYST 1201 and 30.2 parts of methylisobutylketone. Stirring and heating were begun and continued until the batch reached 130° C., at which time heating was discontinued and the batch was allowed to exotherm to 162° C. The batch was heated at 155° C. for 75 minutes, at which time the epoxy value was 0.039 equivalents/100 grams. At this time heating was discontinued as 369.4 parts ethylene glycol butyl ether were added slowly. The final resin had a non volatile content of 51.4%, an epoxy value of 0.038, a Brookfield viscosity of 39,000 Centipoise at 80° F. (~27° C.), and a Tg of 78° C. Based on a theoretical calculation, the final resin included 52 wt-% of aryl groups, based on the total weight of aryl groups in the polymer relative to the weight of the polymer.

Examples 2-6

Coating Compositions

To produce the coating compositions of Examples 2-6, each of the polyether polymers of Example 1, Runs 1 to 5 was cut to a nonvolatile content of 35% with a 1:1 ratio of cyclohexane:Aromatic 150 solvent. Then 20% solids on solids of PHENODUR PR 612 were added, followed by 0.1% $H_3PO_4$ solids on solids added as a 10% solution in butanol. Thus, for each of Runs 1 to 5, was provided acid catalyzed 80/20 polyether/phenolic formulations. Table 2 below indicates the particular polyether polymer of Example 1, Runs 1 to 5 present in each of Examples 2-6.

Coating Properties

The coating compositions of Examples 2-6 were each drawn down with the appropriate sized wire bars to obtain a dry film thickness of 4.5-5.0 milligrams/square inch (metric equivalent is 7-7.8 grams per square meter). The coating compositions were applied to both 0.25 75# tinplate ("ETP") and 75# tin-free steel ("TFS") and baked to cure the coating. The bake was 12 minutes at 403° F. (~206° C.) in a gas-fired, forced-draft box oven. 202 sanitary food can ends were formed from the coated plates. Each can end was given a 14 inch-pound reverse impact (using a two pound weight dropped from the appropriate height) in the center of the uncoated side of the end. The ends were immersed in two different aggressive food products (i.e., Aggressive Food Products 1 and 2 in Table 2) having an initial temperature of 180° F. (82° C.) and stored for 2 weeks at 120° F. (~49° C.). After 2 weeks the ends were removed from the food product, rinsed with water, and evaluated for adhesion, corrosion, stain, and blush. The results are shown in Table 2 below.

As shown in Table 2, the RDGE-containing formulations of Examples 4 and 5 show similar performance to the BPA-containing formulation of Comparative Example 6. The lower Tg CHDMDGE-containing formulations of Examples 2 and 3 were inferior in this test to the higher Tg RDGE-containing formulations of Examples 4 and 5.

TABLE 2

| | Coating Composition | | | | |
|---|---|---|---|---|---|
| | Example 2 | Example 3 | Example 4 | Example 5 | Comparative Example 6 |
| Resin | Example 1, Run 1 | Example 1, Run 2 | Example 1, Run 1 | Example 1, Run 2 | Example 1, Run 5 |
| ETP | | | | | |
| Aggressive Food Product 1 | | | | | |
| Adhesion/ Blush | 8/10 | 8/10 | 10/10 | 10/10 | 10/10 |
| Stain/ Corrosion | 7/7 | 5/7 | 10/10 | 10/10 | 10/10 |
| Aggressive Food Product 2 | | | | | |
| Adhesion/ Blush | 8/10 | 8/10 | 10/10 | 10/10 | 10/10 |
| Stain/ Corrosion | 7/7 | 5/5 | 9/9 | 10/9 | 10/10 |
| TFS | | | | | |
| Aggressive Food Product 1 | | | | | |
| Adhesion/ Blush | 8/7 | 8/7 | 10/10 | 10/10 | 10/10 |
| Stain/ Corrosion | 9/7 | 9/5 | 10/10 | 10/10 | 10/10 |
| Aggressive Food Product 2 | | | | | |
| Adhesion/ Blush | 8/5 | 8/5 | 10/10 | 10/10 | 10/10 |
| Stain/ Corrosion | 9/7 | 9/5 | 10/9 | 10/8 | 10/10 |

The below Examples 7-13 relate to embodiments of the present invention that include a polyether polymer having optional polycyclic groups.

Example 7

Adduct of 2 Moles 4-hydroxy Phenyl Acetic Acid (HPAA) with 1 Mole Tricyclodecane Dimethanol (TCDM)

To a 4-neck round-bottom flask equipped with a mechanical stirrer, a water-cooled condenser on top of a Dean-Stark Trap, and a thermocouple connected to heating control device and a heating mantle were added 705.6 parts of TCDM (from OXEA), 1094.4 parts of HPAA (from Aceto), 1.8 part CATALYST 4201 polymerization catalyst (dibutyl tin oxide from Atofina). Stirring and heating were begun over 4 hours until the batch reached 230° C. The batch was heated at 230° C. for 4 more hours, at which time the acid value was 2.0 mg KOH/gram. At this time, heating was discontinued until the batch reached 120° C., at which time the batch was discharged. The material was a tacky semi-solid at room temperature.

Example 8

Adduct of 2 Moles 4-hydroxy Phenyl Acetic Acid (HPAA) with 1 Mole Isosorbide

To a 4-neck round-bottom flask equipped with a mechanical stirrer, a water-cooled condenser on top of a Dean-Stark Trap, and a thermocouple connected to heating control device and a heating mantle were added 162.2 parts of isosorbide (polymer grade from ADM), 337.8 parts of HPAA, 0.5 parts CATALYST 4201 polymerization catalyst. Stirring and heating were begun over 5 hours until the batch reached 240° C. At this time the acid value was 2.0 mg KOH/gram. Heating was discontinued until the batch reached 150° C., at which time the batch was discharged. The material was a tacky solid at room temperature.

Example 9

Polyether Polymer Incorporating the Adduct of Example 7

To a 4-neck round-bottom flask equipped with a mechanical stirrer, a water-cooled condenser, and a thermocouple connected to heating control device and a heating mantle were added 80.5 parts of the diglycidyl ether of 1,1-Bis(4-hydroyphenyl)-3,3,5-trimethyl-cyclohexane (Sachem, The Netherlands), 73.4 parts of the HPAA-TCDM adduct of Example 7, 0.15 parts CATALYST 1201 polymerization catalyst (from Shell) and 8 parts of methylisobutylketone. Stirring and heating were begun until the batch reached 125° C., at which time the batch was allowed to exotherm to 147° C. The batch was allowed to drift back to 120° C. and held for 2 hours, at which time the epoxy value was 0.040 equivalents/100 grams. At this time heating, was discontinued as 140 parts of a 2:1:1 mixture of xylene:cyclohexanone:propylene glycol methyl ether acetate were added. The final resin composition had a non-volatile content of 52.2%, an epoxy value of 0.033, a viscosity of 3800 centipoises, and a Tg of 88° C.

Example 10

Polyether Polymer Incorporating the Adduct of Example 7

To a 4-neck round-bottom flask equipped with a mechanical stirrer, a water-cooled condenser, and a thermocouple connected to heating control device and a heating mantle were added 55.4 parts of the diglycidyl ether of hydroquinone, 94.7 parts of the HPAA-TCDM adduct of Example 7, 0.15 parts CATALYST 1201 (from Shell) and 16.7 parts of methylisobutylketone. Stirring and heating were begun until the batch reached 120° C., at which time the batch remained between 125 and 130° C. for 3 hours, at which time the epoxy value was 0.041 equivalents/100 grams. At this time heating, was discontinued as 136 parts cyclohexanone were added slowly. The final resin composition had a non-volatile content of 50.7%, an epoxy value of 0.034, and a Tg of 48° C.

Example 11

Polyether Polymer Incorporating the Adduct of Example 8

To a 4-neck round-bottom flask equipped with a mechanical stirrer, a water cooled condenser, and a thermocouple connected to heating control device and a heating mantle were added 68.1 parts of 1,4-cyclohexanedimethanol diglycidyl ether (CHDMDGE from Emeral Materials, New Jersey), 89.2 parts of the HPAA-isosorbide adduct of Example 8, 0.15 parts CATALYST 1201 polymerization catalyst and 8 parts of methylisobutylketone. Stirring and heating were begun until the batch reached 130° C., at which time the batch remained between 125-130° C. for 4 hours, at which time the epoxy value was 0.033 equivalents/100 grams. At this time heating was discontinued as 23 parts cyclohexanone were added slowly, followed by 23 parts of propylene glycol methyl ether acetate and 46 parts of xylene. The final resin composition had a non-volatile content of 61.9%, an epoxy value of 0.034, and a Tg of 36° C.

Example 12

Coating Composition

The polyether polymer composition of Example 9 was cut to a non-volatile content of 35% using a mixture of 1:1 cyclohexane:AROMATIC 150. Then 20% solids on solids of PHENODUR PR 612 phenolic crosslinker (Cytec, Smyrna, Ga.) were added, followed by 0.1% $H_3PO_4$ solids on solids added as a 10% solution in butanol. Thus was provided an acid-catalyzed 80:20 polyether:phenolic coating composition.

The coating composition of Example 12, along with an industry standard BPA-based polyether coating composition, were each applied to both ETP and TFS. The coatings were drawn down with the appropriate-sized wire bars to obtain coatings having a dry-film thickness of 4.5-5.0 milligrams/square-inch ("msi"). The coated metal samples were then baked for 12 minutes in a 403° F. (~206° C.) gas-fired oven. 202 sanitary can ends were formed from the resulting coated plates. Each end was given a 14 inch-pound reverse impact in the center of the uncoated side of the end. The ends were then immersed in two different aggressive food products (i.e., Aggressive Food Products 1 and 2 in Table 2) having an initial temperature of 180° F. (82° C.) and stored for 2 weeks at 120° F. (~49° C.). After 2 weeks the ends were removed from the food product, rinsed with water, and evaluated for adhesion, corrosion, stain, and blush. The results are shown in Table 3 below.

TABLE 3

| Coating Composition | Commercial Control | Example 12 |
|---|---|---|
| ETP | | |
| Aggressive Food Product 1 | | |
| Adhesion/Blush | 10/10 | 10/10 |
| Stain/Corrosion | 10/10 | 10/10 |
| Aggressive Food Product 2 | | |
| Adhesion/Blush | 10/10 | 10/10 |
| Stain/Corrosion | 10/10 | 10/10 |

TABLE 3-continued

| Coating Composition | Commercial Control | Example 12 |
|---|---|---|
| TFS | | |
| Aggressive Food Product 1 | | |
| Adhesion/Blush | 10/10 | 10/10 |
| Stain/Corrosion | 10/10 | 10/10 |
| Aggressive Food Product 2 | | |
| Adhesion/Blush | 10/10 | 10/10 |
| Stain/Corrosion | 10/9 | 10/10 |

As shown in the data of Table 3, the coating composition of Example 12 showed similar performance to the BPA-based commercial control.

Example 13

Coating Composition

The CHDMDGE/HPAA-isosorbide polyether polymer composition of Example 11 was reduced to 40% solids with cyclohexanone. An exterior coating formulation for metal packaging was made by mixing 90 parts of the reduced polymer mixture, 8.6 parts of CYMEL 1054 crosslinker (from Cytec), 0.45 parts of Lanco TF1780 wax (from Lubrizol), and 0.99 parts of Lanocerin product (from Lubrizol). This formulation had a solids content of 41.9% by weight and a polyether to crosslinker ratio (on solids) of 87.5:12.5. The coating was drawn down with a wire bar on planar metal substrate to obtain a coating with a dry-film thickness of 3.5-4.0 msi on TFS metal sheet and double baked using two 10-minute bakes in a 400° F. (~204° C.) oven, and various film properties were tested. A commercial BPA-based epoxy packaging coating product was used as a control and applied and cured in the same manner. The cured coated substrate was then subjected to a variety of tests to assess various coating properties. The data for these tests is reported below in Table 4. As shown in the data of Table 4, the experimental coating composition performed equivalent to that of the commercial control, with the exception of MEK resistance (although 55-60 MEK rubs is considered acceptable).

TABLE 4

| Sample | Control | Example 13 |
|---|---|---|
| Coated Panel Appearance | Good, Smooth | Good, Smooth |
| Dry Adhesion | 10 | 10 |
| 28 Inch-Pounds Reverse Impact Crazing | 10 | 10 |
| 28 Inch-Pounds Reverse Impact Adhesion | 10 | 10 |
| MEK Resistance | >100 | 55-60 |
| Drawn Can Fabrication | 100% Pass | 100% Pass |
| Drawn Can Fabrication + 90 minutes at 250° F. (121° C.) Retort Fuzzies (Assay for Adhesion loss after retort of a drawn can) | 100% Pass | 100% Pass |

The coating data of Table 4 suggests that the coating composition of Example 13 may be suitable for use in forming an external coating on certain packaging coating articles.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. An article comprising:
a metal substrate of a food or beverage can or a portion thereof; and
a coating applied on at least a portion of a surface of the metal substrate, wherein the coating is an interior food-contact coating formed from a coating composition comprising:
a film-forming amount of a polyether polymer having:
a plurality of pendant secondary hydroxyl groups attached to backbone carbon atoms;
one or more segment of the following Formula I:
—O—Ar—(R$_n$—Ar)$_n$—O—,
wherein:
each Ar is independently an aryl or heteroaryl group,
each n is 1,
R includes at least one cyclic group, and
the two oxygen atoms are each ether oxygen;
wherein the coating composition is at least substantially free of bisphenol A and the diglycidyl ether of bisphenol A, and the polyether polymer has a Tg of from 70 to 150° C.

2. The article of claim 1, wherein the polyether polymer has a Tg of from 80 to 110° C.

3. The article of claim 1, wherein aryl or heteroaryl groups constitute at least 20 weight percent of the polyether polymer, based on the total weight of aryl and heteroaryl groups present in the polymer relative to the weight of the polymer.

4. An article comprising:
a metal substrate of a food or beverage can or a portion thereof; and
a coating applied on at least a portion of a surface of the metal substrate, wherein the coating is an interior food-contact coating formed from a coating composition comprising:
a film-forming amount of a polyether polymer having:
a plurality of pendant secondary hydroxyl groups attached to backbone carbon atoms;
one or more segment of the following Formula I:
—O—Ar—(R$_n$—Ar)$_n$—O—,
wherein:
each Ar is independently an aryl or heteroaryl group,
each n is 1,
R includes at least one cyclic group, and
the two oxygen atoms are each ether oxygen; and
a glass transition temperature (Tg) of at least 70° C.; and
wherein the coating composition is at least substantially free of bisphenol A and the diglycidyl ether of bisphenol A, the polyether polymer is a reaction product of ingredients including a polyepoxide and a polyhydric phenol, and the coating has an overall average dry coating thickness of about 2 to about 12 microns.

5. The article of claim 4, wherein each of the polyepoxide and the polyhydric phenol independently include an aryl or heteroaryl group, and wherein the polyepoxide includes the segment of Formula I.

6. The article of claim 4, wherein one or more of the polyepoxide or polyhydric phenol are selected from 1,1-di (4-hydroxyphenyl)-cyclohexane, 1,1-di(4-hydroxy-3-methylphenyl)-cyclohexane, 1,1-di(4-hydroxy-3,5-dimethylphenyl)-cyclohexane, or the diglycidyl ether of any of these.

7. The article of claim 4, wherein one or more of the polyepoxide or polyhydric phenol are selected from: 1,1-bis(4-hydroxyphenyl)-3,3,5-trimethyl-cyclohexane or the diglycidyl ether of 1,1-bis(4-hydroxyphenyl)-3,3,5-trimethyl-cyclohexane.

8. The article of claim 1, wherein R includes a quaternary carbon atom in a backbone segment connecting the two Ar groups.

9. The article of claim 1, wherein the at least one cyclic group is an aryl or heteroaryl group.

10. The article of claim 1, wherein: (i) R is free of ester linkages and (ii) the at least one cyclic group is a divalent alicyclic group.

11. An article comprising:
a metal substrate of a food or beverage can or a portion thereof; and
a coating applied on at least a portion of a surface of the metal substrate, wherein the coating is an interior food-contact coating formed from a coating composition comprising:
a film-forming amount of a polyether polymer having:
a plurality of pendant secondary hydroxyl groups attached to backbone carbon atoms;
one or more segment of the following Formula I:
—O—Ar—(R$_n$—Ar)$_n$—O—,
wherein:
each Ar is independently an aryl or heteroaryl group,
each n is 1,
R includes at least one cyclic group, and
the two oxygen atoms are each ether oxygen; and
a glass transition temperature (Tg) of at least 70° C.; and
wherein the coating composition is at least substantially free of bisphenol A and the diglycidyl ether of bisphenol A, R has a molecular weight of greater than 75 and less than 500, and segments of Formula I constitute at least 30 weight percent of the polymer.

12. A thermoset coating composition, comprising:
a film-forming amount of a polyether polymer, wherein the polyether polymer is a reaction product of ingredients including a dihydric phenol and a diepoxide, the polyether polymer having:
one or more segments of the following Formula I:
—O—Ar—(R$_n$—Ar)$_n$—O—, wherein:
each Ar is independently a phenylene group,
each n is 1,
R includes at least one cyclic group, and
the two oxygen atoms are each ether oxygen;
a plurality of secondary hydroxyl groups attached to backbone carbon atoms, in —CH$_2$—CH(OH)—CH$_2$— segments;
and a number average molecular weight of at least 2,000; and
a liquid carrier;
wherein the coating composition is at least substantially free of bisphenol A and the diglycidyl ether of bisphenol A, and the polyether polymer has a Tg of from 70 to 150° C.

13. The coating composition of claim 12, wherein the polyether polymer has a Tg of from 80 to 110° C.

14. The coating composition of claim 12, wherein the polyether polymer does not include a segment of Formula I in which n is 1 and R comprises a segment of the below formula:

$$-R^5_t-C(O)-O-R^4-O-C(O)-R^5_t-$$

wherein:
R$^4$ is a divalent organic group;
each R$^5$ is a divalent organic group; and
each t is 0 or 1.

15. An article comprising:
a metal substrate of a food or beverage can or a portion thereof; and
a food-contact coating applied on at least a portion of an interior surface of the metal substrate, wherein the coating is formed from a thermoset coating composition comprising:
a polyether polymer that has a glass transition temperature (Tg) of at least 70° C. and has a backbone that includes:
(i) segments of the following Formula I: —O—Ar—(R$_n$—Ar)$_n$—O—, wherein:
each Ar is independently a phenylene group,
each n is 1,
R includes at least one cyclic group, and
the two oxygen atoms are each ether oxygen; and
(ii) a plurality of secondary hydroxyl groups attached to backbone carbon atoms, in —CH$_2$—CH(OH)—CH$_2$— segments; and
a liquid carrier;
wherein the coating composition is at least substantially free of bisphenol A and the diglycidyl ether of bisphenol A, the polyether polymer is a reaction product of ingredients including a diepoxide and a dihydric phenol, and the coating is a mono-layer or multi-layer coating having an overall average dry coating thickness of from about 3 to about 12 microns.

16. The article of claim 15, wherein the polyether polymer has a number average molecular weight of at least 2,000 and constitutes at least 30 weight percent of the coating composition, based on the total weight of resin solids in the coating composition.

17. The article of claim 15, wherein the polyether polymer does not include a segment of Formula I in which n is 1 and R comprises a segment of the below formula:

$$-R^5_t-C(O)-O-R^4-O-C(O)-R^5_t-$$

wherein:
R$^4$ is a divalent organic group;
each R$^5$ is a divalent organic group; and
each t is 0 or 1.

18. The article of claim 15, wherein the polyether polymer includes at least 30 weight percent of the segments of Formula I.

19. The article of claim 16, wherein the polyether polymer includes at least 50 weight percent of the segments of Formula I.

20. The article of claim 15, wherein the polyether polymer has a Tg of from 70 to 150° C.

* * * * *